United States Patent
Wan

(10) Patent No.: US 7,137,355 B1
(45) Date of Patent: Nov. 21, 2006

(54) SELF-CLEANING PET LITTER APPARATUS WITH ROTATING RAKE AND PAN

(75) Inventor: Yiu Chung Wan, Tsuen Wan (HK)

(73) Assignee: Doskocil Manufacturing Company, Inc., Arlington, TX (US)

( * ) Notice: Subject to any disclaimer, the term of this patent is extended or adjusted under 35 U.S.C. 154(b) by 0 days.

(21) Appl. No.: 11/250,499

(22) Filed: Oct. 15, 2005

Related U.S. Application Data

(62) Division of application No. 10/967,613, filed on Oct. 18, 2004, now Pat. No. 7,017,519.

(51) Int. Cl.
*A01K 1/035* (2006.01)

(52) U.S. Cl. ................................ 119/166; 119/161

(58) Field of Classification Search ............... 403/349, 403/348; 119/161–170, 76
See application file for complete search history.

(56) References Cited

U.S. PATENT DOCUMENTS

| | | | |
|---|---|---|---|
| 2,299,357 A * | 10/1942 | Strunk et al. ............... 403/182 |
| 2,362,856 A * | 11/1944 | Strunk et al. ............... 403/182 |
| 2,901,258 A * | 8/1959 | Gabriel ......................... 279/97 |
| 2,963,003 A | 12/1960 | Oberg et al. |
| 3,423,781 A * | 1/1969 | Henson ......................... 15/145 |
| 3,854,832 A * | 12/1974 | Cowper ....................... 403/349 |
| 3,933,011 A * | 1/1976 | DiGilio et al. ............... 63/29.1 |
| 4,027,625 A | 6/1977 | Wheeler |
| 4,050,414 A | 9/1977 | Knochel et al. |
| 4,120,264 A | 10/1978 | Carter |
| 4,176,815 A * | 12/1979 | Davidson et al. ........... 248/589 |
| 4,190,525 A | 2/1980 | Menzel |
| 4,305,180 A * | 12/1981 | Schwartz .................... 439/296 |
| 4,487,469 A * | 12/1984 | Bjork ......................... 403/349 |
| 4,518,162 A * | 5/1985 | Oates ........................... 482/93 |
| 4,574,435 A * | 3/1986 | Luciano et al. ............. 24/33 C |
| 4,574,735 A | 3/1986 | Hohenstein |
| 4,846,104 A | 7/1989 | Pierson, Jr. |
| 4,943,182 A * | 7/1990 | Hoblingre .................... 403/349 |
| 5,048,463 A | 9/1991 | Wilson et al. |
| 5,048,464 A | 9/1991 | Shirley |
| 5,048,465 A | 9/1991 | Carlisi |
| 5,107,797 A | 4/1992 | LaRoche |
| 5,167,204 A | 12/1992 | Nussle |
| 5,178,099 A | 1/1993 | Lapps et al. |
| 5,180,284 A * | 1/1993 | Monrose et al. .......... 416/204 R |
| 5,226,388 A | 7/1993 | McDaniel |
| 5,259,340 A | 11/1993 | Arbogast |
| 5,272,999 A | 12/1993 | Nussle |

(Continued)

*Primary Examiner*—Teri Pham Luu
*Assistant Examiner*—Kimberly S. Smith
(74) *Attorney, Agent, or Firm*—Locke Liddell & Sapp, LLP

(57) ABSTRACT

A self-cleaning litter apparatus that separates and extracts clumped litter waste material from litter material contained therein during use includes a chamber adapted to contain a quantity of litter material. The chamber is rotatable about a centrally disposed axis. A rake is disposed within the chamber. The rake is rotatable about an axis which is spaced apart from the chamber axis. A drive assembly is provided for simultaneously rotating the chamber about the chamber axis and for rotating the rake about the rake axis. The rake sweeps through the litter material while clumped litter waste material is directed toward the rake by rotation of the chamber to thereby separate clumped litter waste material from the litter material in the chamber, collect the separated clumped litter material in the rake and extract the separated clumped litter material from the chamber.

3 Claims, 26 Drawing Sheets

U.S. PATENT DOCUMENTS

| | | | |
|---|---|---|---|
| 5,279,258 A | | 1/1994 | Kakuta |
| 5,303,944 A | * | 4/1994 | Kalmus ............... 403/349 |
| 5,477,812 A | | 12/1995 | Waters |
| 5,509,379 A | | 4/1996 | Hoeschen |
| 5,513,622 A | * | 5/1996 | Musacchia, Sr. ........... 124/89 |
| 5,544,620 A | | 8/1996 | Sarkissian |
| 5,551,375 A | | 9/1996 | Flores |
| 5,558,405 A | * | 9/1996 | Ishikura et al. ........... 403/182 |
| 5,564,364 A | | 10/1996 | Kovacs et al. |
| 5,572,950 A | | 11/1996 | O'Rourke et al. |
| 5,592,900 A | | 1/1997 | Kakuta |
| 5,622,140 A | | 4/1997 | McIlnay-Moe |
| 5,662,066 A | | 9/1997 | Reitz |
| 5,741,084 A | * | 4/1998 | Del Rio et al. ........... 403/349 |
| 5,749,318 A | | 5/1998 | Barbot et al. |
| 5,752,465 A | | 5/1998 | Page |
| 5,755,181 A | | 5/1998 | Petkovski |
| 5,794,566 A | | 8/1998 | Goetz et al. |
| 5,868,533 A | * | 2/1999 | Fiala ............... 408/226 |
| 5,931,119 A | | 8/1999 | Nissim et al. |
| 6,003,724 A | * | 12/1999 | Collins et al. ........... 221/154 |
| 6,039,003 A | | 3/2000 | Cox |
| 6,055,935 A | | 5/2000 | Engel |
| 6,082,302 A | | 7/2000 | Thaler et al. |
| RE36,847 E | | 9/2000 | Waters |
| 6,126,015 A | | 10/2000 | Haymaker |
| 6,202,595 B1 | | 3/2001 | Atcravi |
| 6,205,953 B1 | | 3/2001 | Ginn |
| 6,205,954 B1 | | 3/2001 | Bogaerts |
| 6,234,112 B1 | | 5/2001 | Emery |
| 6,286,457 B1 | | 9/2001 | Sugahara |
| 6,286,459 B1 | | 9/2001 | Parr |
| 6,289,847 B1 | | 9/2001 | Carlisi |
| 6,367,420 B1 | | 4/2002 | Tomlinson |
| 6,378,461 B1 | | 4/2002 | Thaler et al. |
| 6,394,782 B1 | * | 5/2002 | Grassi ............... 425/384 |
| 6,401,661 B1 | | 6/2002 | Emery |
| 6,438,784 B1 | * | 8/2002 | Yu ............... 15/106 |
| 6,543,204 B1 | * | 4/2003 | Gruson ............... 53/331.5 |
| 6,568,348 B1 | | 5/2003 | Bedard |
| 6,588,369 B1 | | 7/2003 | Carlisi |
| 6,701,868 B1 | | 3/2004 | Shepherd |
| 6,763,782 B1 | | 7/2004 | Kordelin |
| 6,789,491 B1 | * | 9/2004 | Takahashi et al. ........ 114/67 A |
| 6,851,386 B1 | | 2/2005 | Northrop et al. |
| 6,863,026 B1 | | 3/2005 | Northrop et al. |
| 6,892,670 B1 | | 5/2005 | Northrop et al. |
| 6,951,190 B1 | | 10/2005 | Northrop et al. |
| 2002/0037614 A1 | | 3/2002 | Carlisi |
| 2002/0134314 A1 | | 9/2002 | Carlisi |
| 2002/0139312 A1 | | 10/2002 | Reltz |
| 2002/0139313 A1 | | 10/2002 | Mack, Jr. et al. |
| 2004/0177816 A1 | | 9/2004 | Parr |

\* cited by examiner

SELF-CLEANING PET LITTER APPARATUS WITH ROTATING RAKE AND PAN

CROSS-REFERENCE TO RELATED APPLICATION

This application is a Divisional of U.S. patent application Ser. No. 10/967,613 filed Oct. 18, 2004 now U.S. Pat. No. 7,017,519 and entitled "Self-Cleaning Pet Litter Apparatus and Related Method."

TECHNICAL FIELD

The present invention pertains to litter boxes for use by animals, typically cats. More particularly, this invention is directed toward apparatus which operates in a self-cleaning fashion, either automatically or manually, to remove waste materials deposited in the litter, thereby obviating the need for frequent and periodic service by the animal's owner.

BACKGROUND OF THE INVENTION

Domestic pets, particularly cats, typically utilize a litter box for their waste needs. Such litter boxes fall into two categories, the totally manual pan or container which carries a quantity of litter and the automatic or self-cleaning variety, which also carries a quantity of litter. The present invention pertains to the latter category and the patent literature does include a variety of such devices. U.S. Pat. No. 6,568,348, for instance, is directed to a circular litter device that extracts waste from litter material by rotating a rake or the chamber. Due to rotation of the rake or chamber, solid waste is extracted from the litter material using tines, and such waste is pushed to the outer perimeter of the chamber. The curvature of the rake allows the rake to cooperate with a scoop, which simultaneously removes solid waste from the rake and retracts into a tunnel, as the rake passes thereby.

U.S. Pat. Nos. 6,401,661 and 6,234,112 are both directed to a self cleaning pet litter box. The pet litter container is rotatably mounted on a base member, and rotates to move the pet litter over a sieve. The sieve is ramped shaped and therefore, clumped portions of the pet litter that are not sifted through its openings are forced upwardly toward a conveyer. The conveyer serves to carry the clumped portions of pet litter away from the pet litter container.

U.S. Pat. No. 6,286,459 is directed to a litter container with a rotary movement sieve. The sieve is attached to a rotatable ring around the upper portion of a container. As the sieve rotates, clumped portions of solid waste are captured thereon. Since the sieve is removable, the sieve, and the clumped portions of solid waste can be removed from the container.

U.S. Pat. Nos. 6,082,302 and 5,447,812, are both directed to a rectangular litter device that extracts waste from litter material using a comb that traverses the pan lengthwise, eventually conveying waste clumps into a receptacle at the front of the device.

U.S. Pat. No. 4,574,735 is directed to a circular litter device that extracts waste from litter material using a rake which sweeps through a circular chamber. In this device, the waste material is deposited into a container which is rotated to sanitize and deodorize the contents.

The foregoing automatic litter devices have provided a variety of styles and mechanisms to facilitate periodic cleaning of the litter. Nonetheless, the apparatus of the present invention provides a novel approach to the design and operation of such devices by providing a single drive mechanism for the operation of all moving elements as well as other features not present in combination in a single device heretofore.

SUMMARY OF THE INVENTION

In accordance with the present invention, a self-cleaning litter apparatus that separates and extracts clumped litter waste material from litter material contained therein during use is provided. The litter apparatus includes a chamber adapted to contain a quantity of litter material. The chamber is rotatable about a centrally disposed axis. A rake is disposed within the chamber. The rake includes a plurality of tines for receiving clumped litter waste material from the litter material and for extracting the clumped litter waste material from the chamber. The rake is rotatable about an axis which is spaced apart from the chamber axis. A drive assembly is provided for simultaneously rotating the chamber about the chamber axis and for rotating the rake about the rake axis. The rake sweeps through the litter material while clumped litter waste material is directed toward the rake by rotation of the chamber to thereby separate clumped litter waste material from the litter material in the chamber, collect the separated clumped litter material in the rake and extract the separated clumped litter material from the chamber.

DETAILED DESCRIPTION OF THE INVENTION

Figure 1:
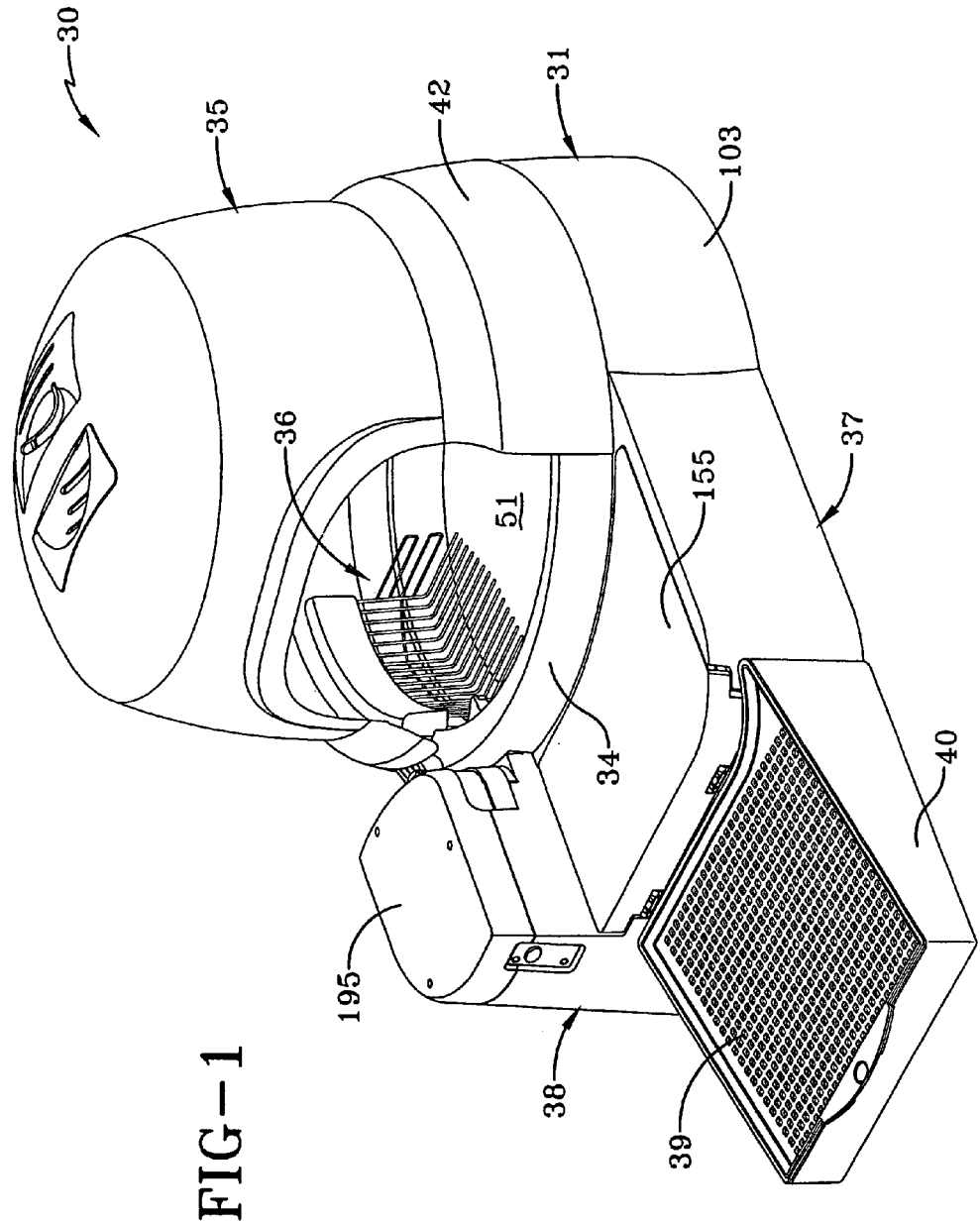
FIG. 1 is an isometric view depicting the self-cleaning litter apparatus of the present invention.
Figure 2:
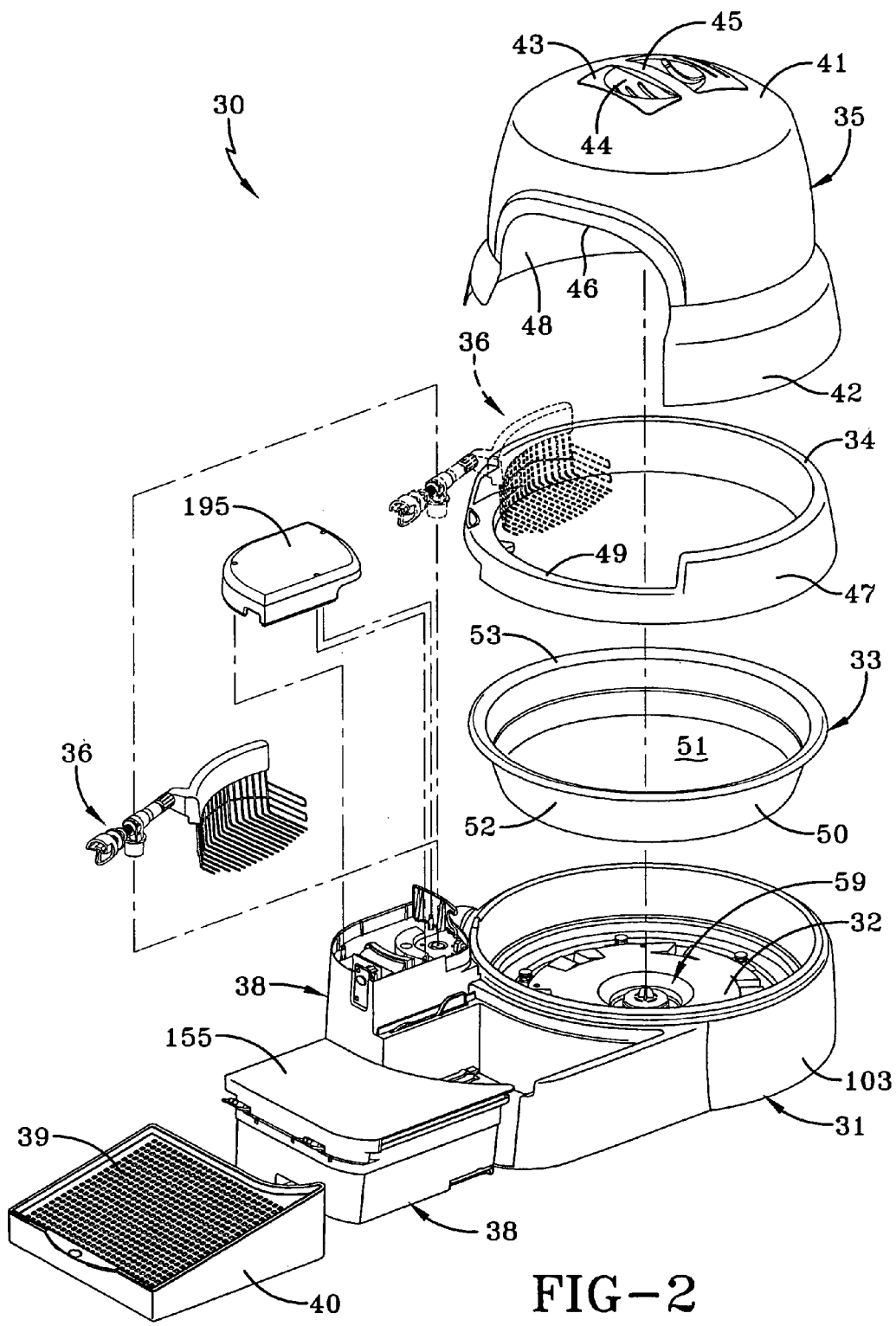
FIG. 2 is an exploded isometric view of the self-cleaning litter apparatus of the present invention.

With reference to FIGS. 1 and 2, a self-cleaning litter apparatus according to the present invention, is depicted generally by the numeral 30. It includes a main base, generally 31, which carries a turntable, generally 32, a litter pan, generally 33, received onto the turntable, a shield 34, a hood 35, a rake assembly, indicated generally by the numeral 36, a waste receptacle 37, a housing 38 for the drive mechanism, which will be described subsequently and a ramp 39, which may optionally provide a mat 40, for the purpose of cleaning litter from the pet upon exiting the apparatus. Of these components, the hood 35 and the ramp 39 are both optional, as the self-cleaning features of the apparatus do not require the presence of either component. In order to aid in manufacturing, while providing strength and reasonable cost, the various components are manufactured from a conventional thermoplastic, such as ABS or a polyolefin, such as polyethylene or polypropylene. Other components, such as the internal gears can be manufactured from nylon.

The hood 35 provides a domed top 41 which terminates in an outwardly extending annular flange 42. A recess 43 is provided in the top 41 for receipt of an air filter element 44, which is removable from the underside of the hood. A handle 45, is molded into the top over the recess. The front of the hood 35 provides an opening 46, through which the cat, or other domestic pet, enters and leaves the litter apparatus.

The shield 34 is removable, lifting off of the litter pan 33, when the latter is to be cleaned. It comprises a truncated annular flange, the outer wall 47 of which frictionally engages the inner wall 48 of the hood 35. The outer wall 47 is recessed, to provide an opening 49, extending across less than one-half of the front of shield 35, to allow for movement of the rake assembly 36, as will be described later.

Figure 7:
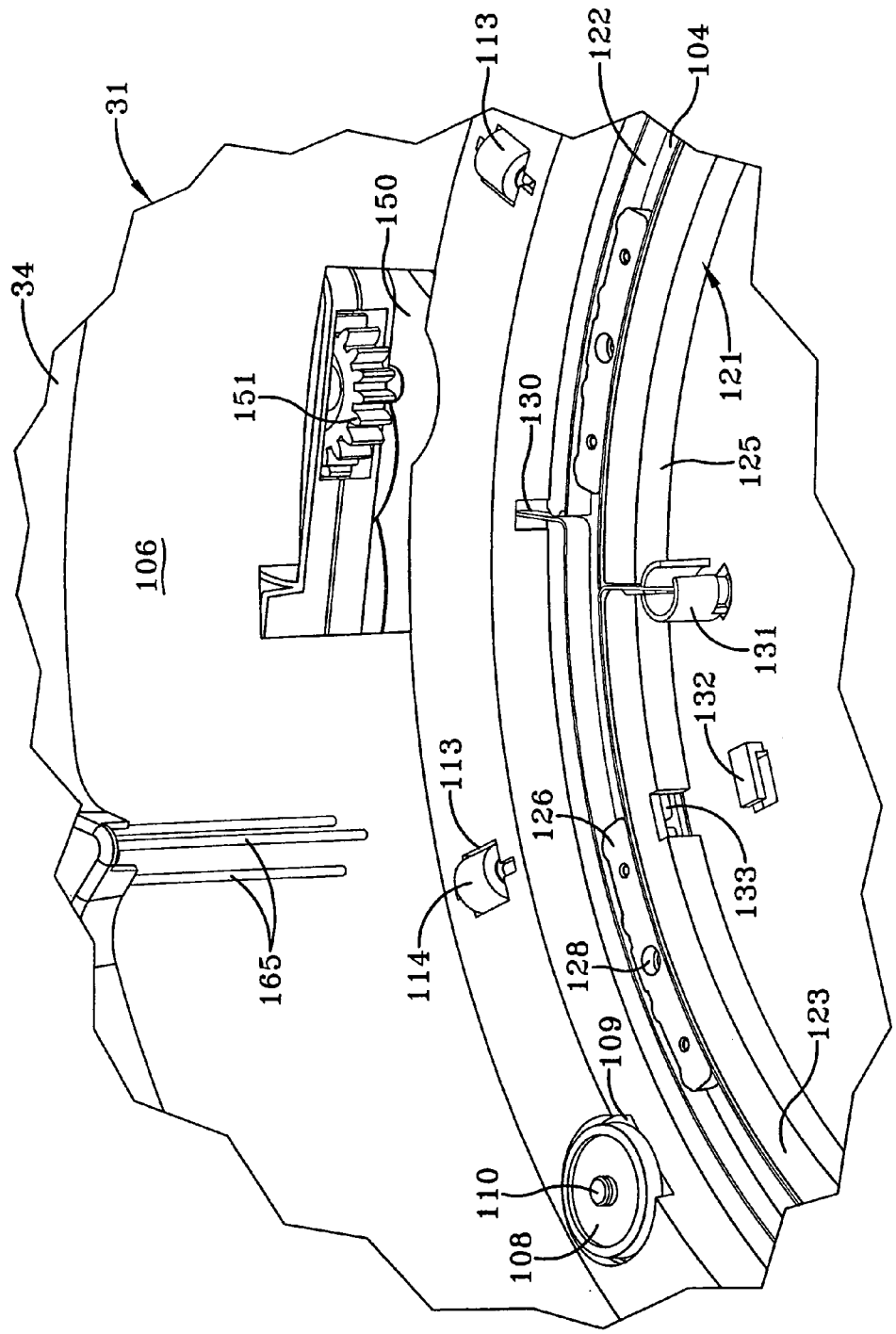
FIG. 7 is a partial isometric view depicting the base of the self-cleaning litter apparatus and related components for driving the turntable.

The litter pan 33 includes a body 50 having a circular base 51, a continuous upwardly extending sidewall 52, terminating in an outwardly extending annular flange 53. In FIG. 7, the bottom of pan of 33 is depicted, showing the underside 54 of base 51. Underside 54 provides a several projections at various positions. A coupling, generally 55, is centrally located and includes a ring 56 encompassing a recess 58, for receipt of a hub-spindle assembly, generally 59, carried centrally of the turntable 32. Radiating outwardly from the ring 56 are a plurality of fins 60, which mate with the spindle, as will be described in greater detail below, so that as the turntable 32 is rotated, the litter pan 33 is likewise rotated.

Figure 5:
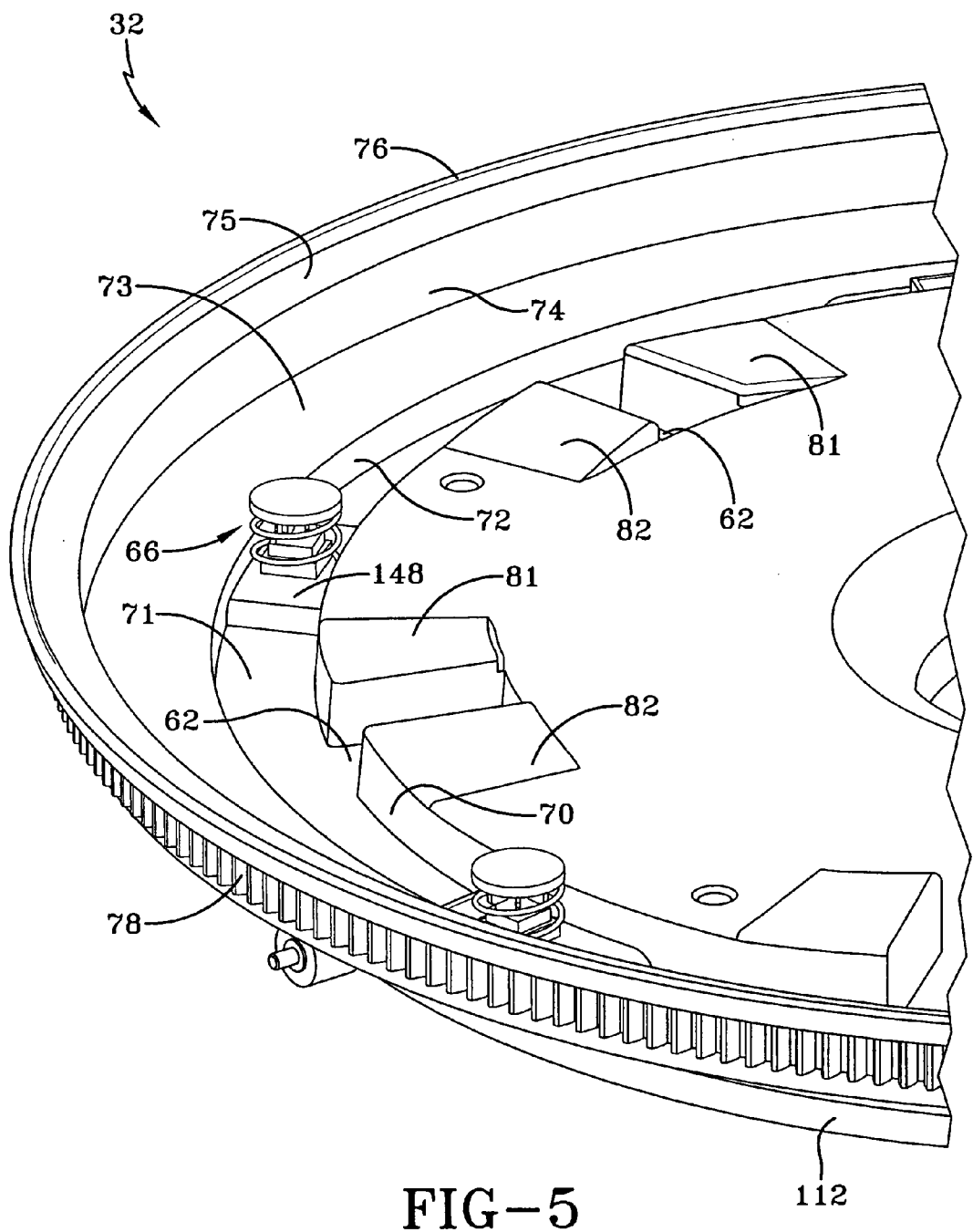
FIG. 5 is a partial isometric view depicting the turntable of the self-cleaning litter apparatus.

Radially outwardly of the coupling 55 are a plurality of feet 61, which are received in foot wells 62, provided in the floor 63 of the turntable 32 (FIG. 5). Radially outwardly of the feet 61 are a plurality of buttons 65, which engage weight sensors, generally 66, which are carried by the turntable 32.

Figure 6:
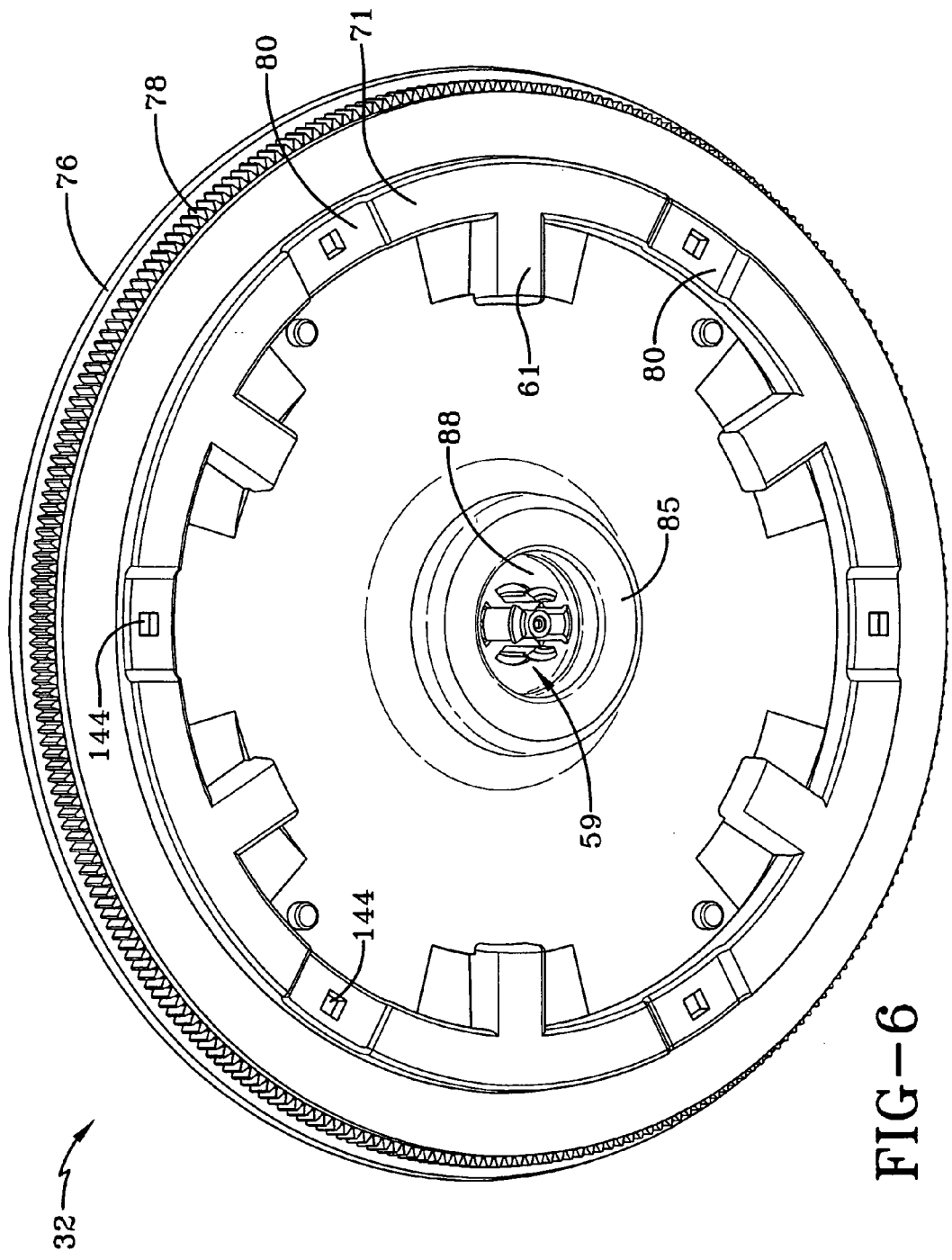
FIG. 6 is an isometric view depicting the underside of the turntable.
Figure 10:
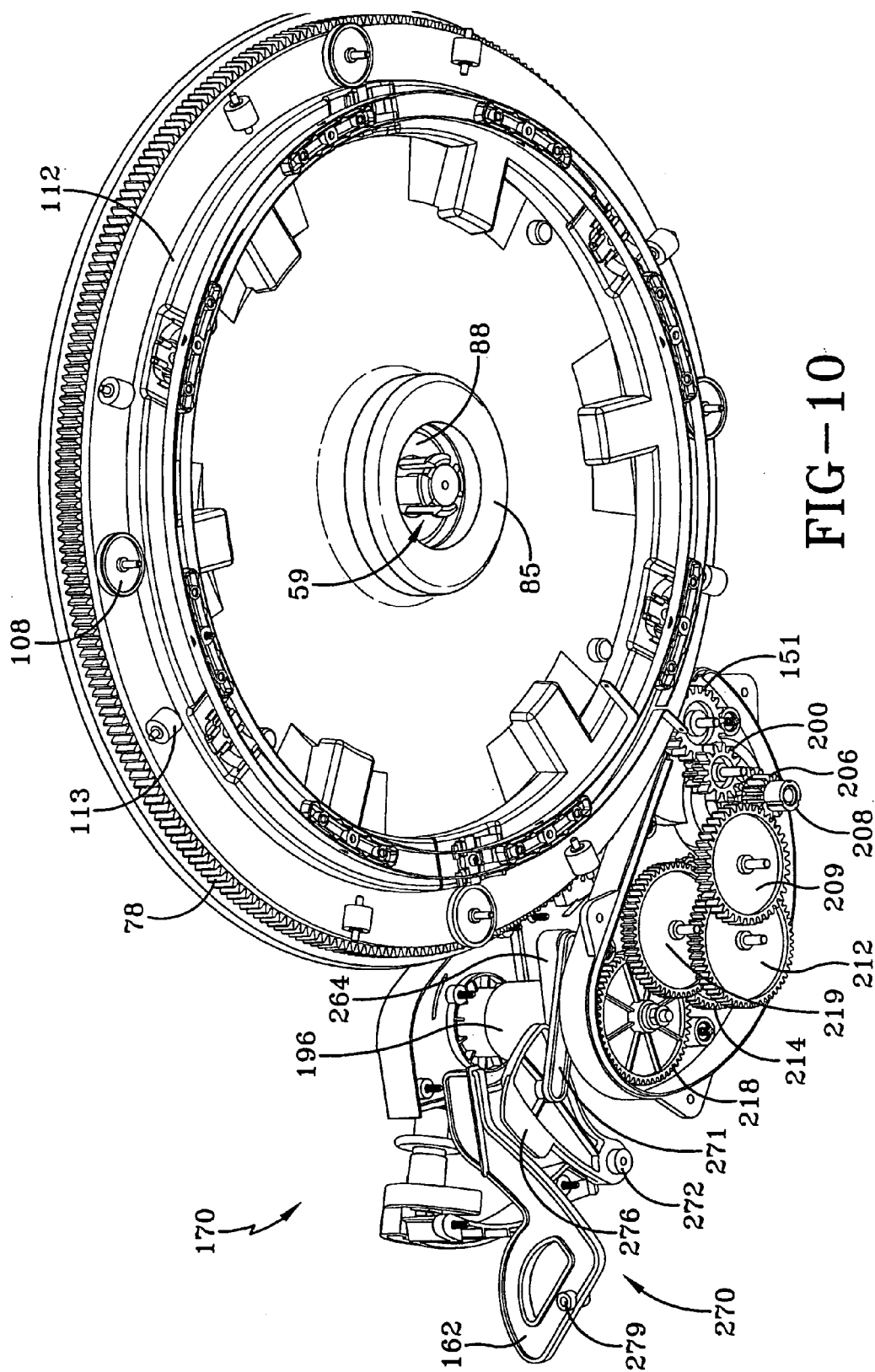
FIG. 10 is another isometric view depicting the underside of the turntable and the drive mechanism, with portions of the apparatus removed for clarity.

The turntable 32 is depicted in FIGS. 5, 6, and 10 to which reference should be made next. Beginning with FIGS. 5 and 6, the turntable is generally dish shaped and has a raised central floor 63 which extends over a major portion of the diameter. It terminates with downward sidewall, which forms the inner wall 70 of an annular trough 71, beneath the floor. The trough continues to an outer wall 72, which extends upwardly to join an outer rim 73, slightly lower than the floor 63. An outer ring wall 74 extends upwardly from the rim 73, terminating in an upper face 75 and upstanding peripheral rim 76. On the outside of outer ring wall 74, a ring gear 78 is formed, which allows the turntable to be rotated.

In FIG. 6, the turntable is viewed from its underside, where it can be seen that the trough 71 has a plurality of discontinuities, each extending partially upwardly within the trough providing platforms 80, each carrying a weight sensor 66. As depicted in the drawing, six such platforms 80 are shown, although the turntable could be modified to provide more or less than six so long as a sufficient number are present to sense the weight of an animal in the litter pan, which will be explained hereinbelow. Returning to FIG. 5 and the upper side of turntable 32, the foot wells 62 in central floor 63 are coplanar with the trough 71 and are bounded by leading and trailing ramps, 81, 82, which help orient the placement of the litter pan 33 and engagement of the feet 61 in the wells 62.

Figure 3:
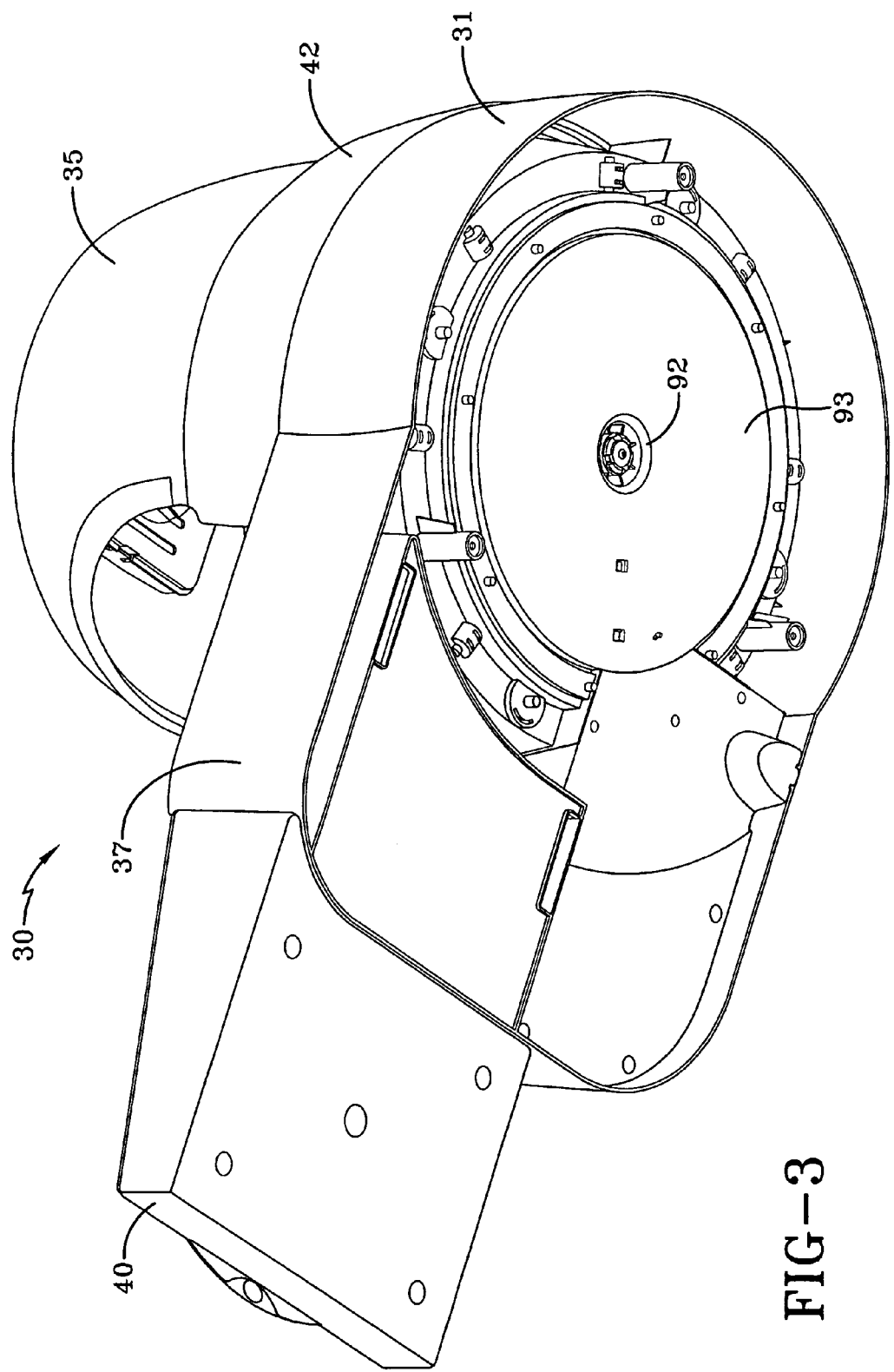
FIG. 3 is an isometric view depicting the underside of the self-cleaning litter apparatus of the present invention.
Figure 4:
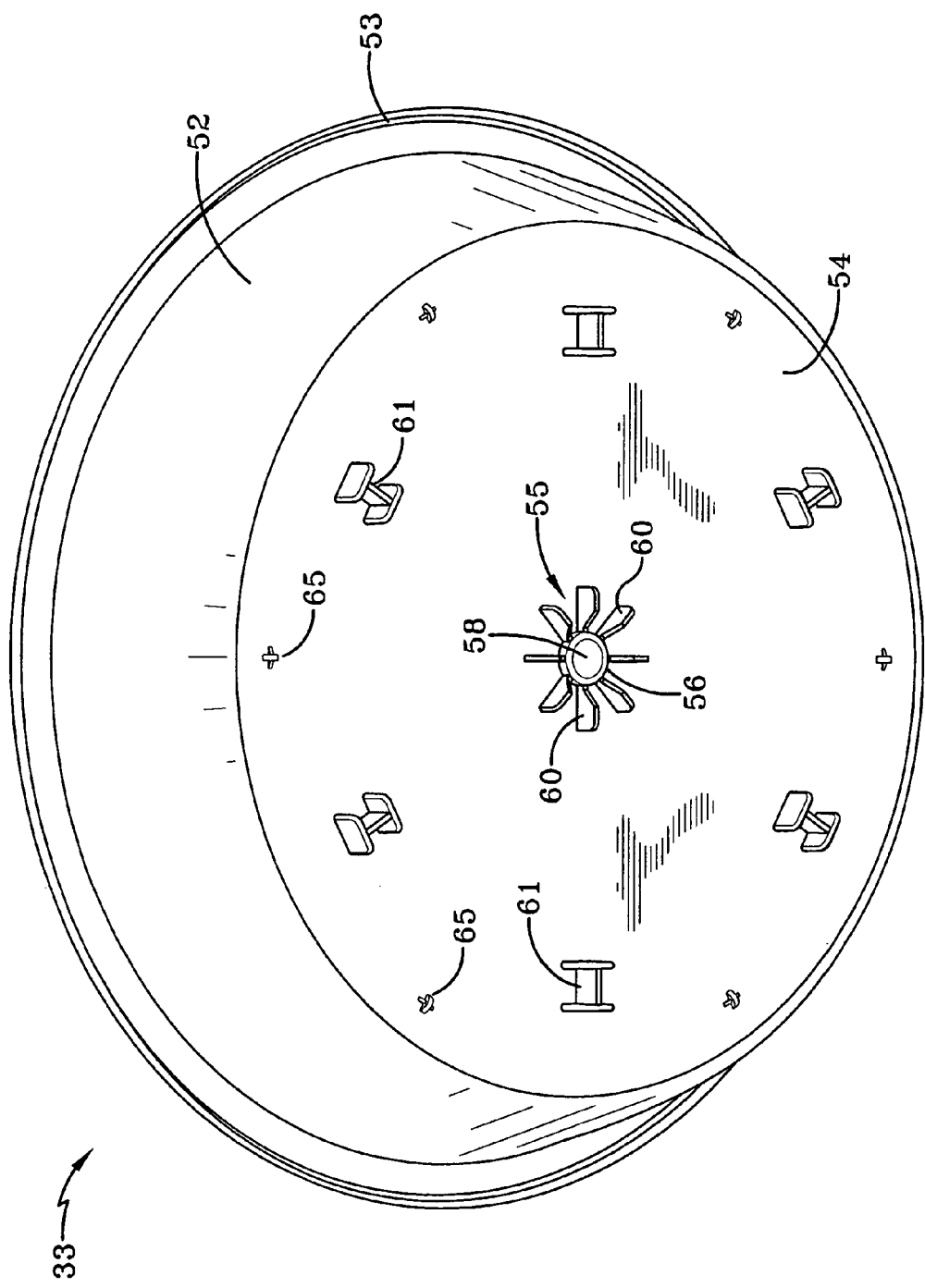
FIG. 4 is an isometric view depicting the underside of the litter pan.

At the center of the turntable, is the hub-spindle assembly 59, comprising a hub 85 and a spindle 86. The hub 85 is a small diameter cup which extends from and below the turntable floor 63 and terminates in a raised shelf 88, also beneath the plane of the floor 63. The spindle 86, depicted in FIG. 11B, provides two intersecting semi-elliptical members 89 which terminate in a rounded end upon which the recess 58 in the coupling member 55 of litter pan 33 rests, so as to be tiltably rotatable thereon. The members 89 are carried by a platform 90 and extending downwardly therefrom are four fingers 91 disposed at 90° angles from each other. The spindle fingers 91 are snapped into an open base hub 92, formed in the floor 93 of main base 31 (see FIG. 3).

The fingers 91 have outwardly extending flanges 94, which lock against the bottom edge 95 of base hub 92. As also shown in FIG. 11B, a screw 96, carrying a spacer 98 is driven into the central body 99 of spindle 86, which urges the fingers 91 into engagement with the base hub 92. In this manner the turntable 32 is fastened to the base and can likewise be disassembled by first removing the screw 96. To aid rotation of the turntable 32 over the base hub 92 of the base 31, a washer 100 is interposed.

Figure 11:
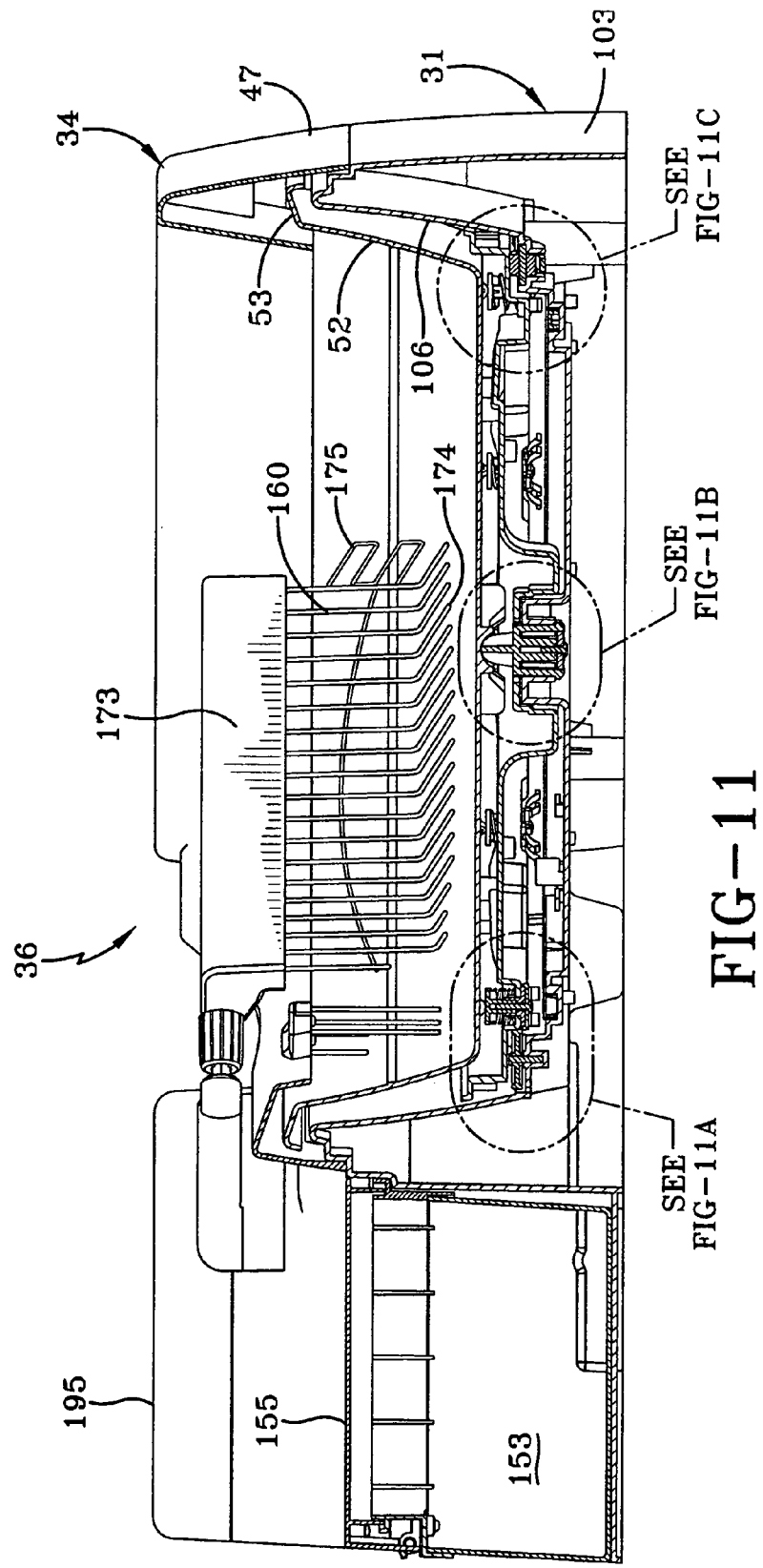
FIG. 11 is a cross-sectional view of the apparatus, depicting the base, turntable, litter pan and rake assembly.

The floor 93 of main base 31 is partially depicted in FIG. 7 and in cross-section in FIG. 11, to which reference should be made next. Generally, the floor 93 is molded to allow for the turntable 32 to rotate freely therein, the latter having been mounted therein as previously described. In addition, the base also provides two other mechanisms—one to assist rotation of the turntable and one that works as part of the weight sensing mechanism, which will be described subsequently. The base has an exterior wall 103, for appearance and enclosing the drive mechanism.

Figure 11A:
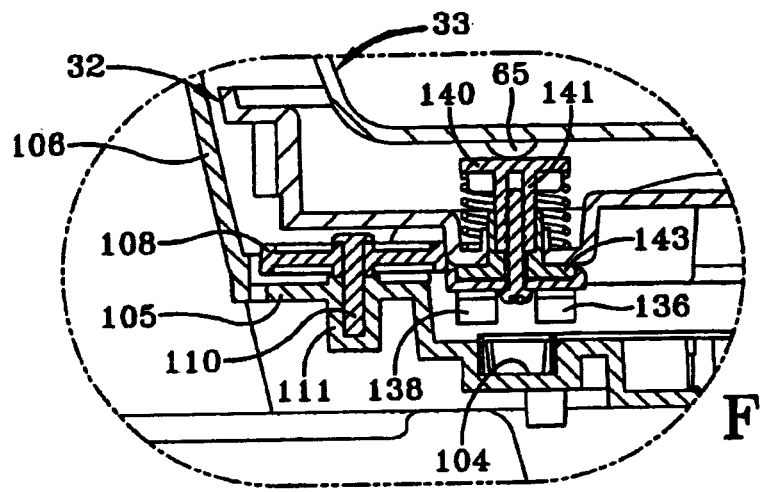
FIG. 11A is an enlarged cross-section of the area 11A, depicted in FIG. 11.
Figure 11B:
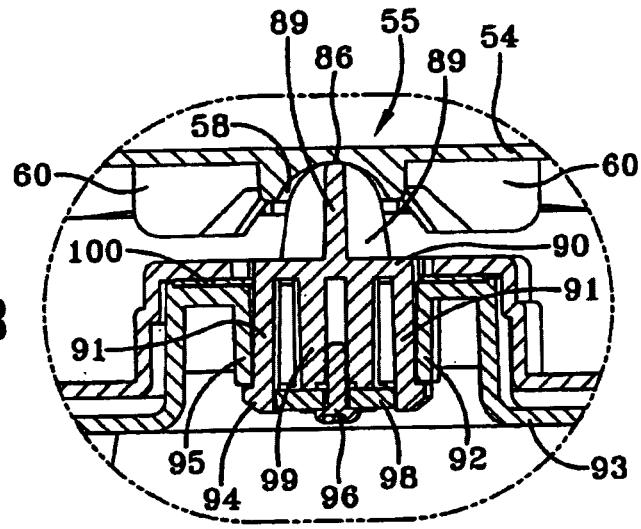
FIG. 11B is an enlarged cross-section of the area 11B, depicted in FIG. 11.

As clearly depicted in FIGS. 7 and 11A, the floor 93 of main base 31 carries an annular trough 104, near its periphery. Radially outwardly from the trough 104 is a raised shelf 105, which extends to the inner wall 106 of base 31. A plurality of wheels 108 are fit into recesses 109 in shelf 105, each said wheel being rotatably mounted about an axle 110, pressed into a mating well 111 carried in the underside of shelf 105. The wheels 108 protrude outwardly from the shelf 105, as depicted in FIG. 7, where they will periodically engage the outer edge 112 of annular trough 71 (see the underside of turntable 32) to keep it centered and supported about the spindle 86. The number of wheels is not crucial to the operation of the apparatus, so long as they are equally spaced about the circumference. Typically, four wheels are adequate.

A like plurality of rollers 113 are carried in semi-cylindrical recesses 114, in the shelf 105. The rollers reduce friction between the turntable 32 and main base 31 as the turntable is rotated therein. The combined support and centering can be seen schematically in FIG. 10, where the main base has been removed from view, leaving the rollers 113 and wheels 108 in place against the underside of turntable 32. Again, the number of rollers 113 is not crucial to the operation of the apparatus, so long as they are equally spaced about the circumference. Typically, eight rollers are adequate. Together, the rollers and wheels provide a supporting and centering mechanism, indicated generally by the numeral 115, for the turntable 32.

The weight sensing mechanism is indicated generally by the numeral 120 and it includes the weight sensors 66 and a track assembly, generally 121. Referring to FIG. 7, the track assembly comprises a pair of electrically conductive outer and inner rails 122, 123, respectively. The rails are mounted in the annular trough 104, which is formed into a raised shelf 125, and extends upwardly from the floor 93 of the base 31. Spacers 126, made from plastic or other non-conductive material, are located periodically around the shelf 125 in a number sufficient to maintain the rails parallel to each other. The spacers are suitably fastened within the trough 104 by screws, not shown, passing though apertures 128 and their width forces the opposed rails against the walls of the trough so as to remain immovable therein. An end of the outer rail 122 is bent and passes through an aperture 130 in the base to the underside and is connected electrically to a power source (not shown). The opposite end of rail 122 is brought around the trough 104 and into contact with the beginning end. In similar fashion, an end of the inner rail 123 is bent and passes to a shield 131, where a wire (not shown) is connected, fed around tab 132 and through aperture 133 in the base to the underside for connection to the power source. The opposite end of rail 123 is brought around the trough 104 and into contact with the beginning end.

Figure 8:
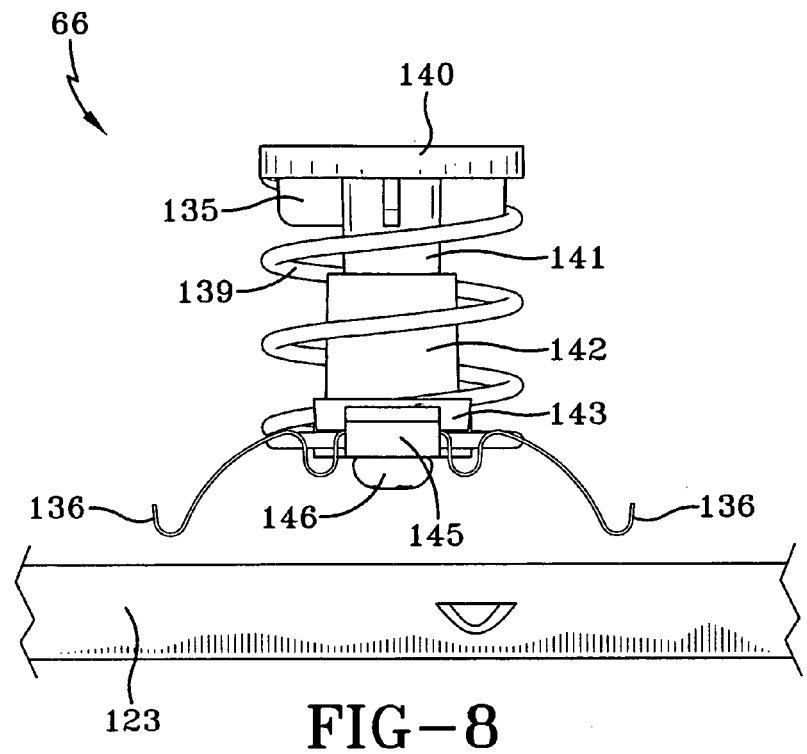
FIG. 8 is a side elevation of a weight sensor, depicted over the contact rails carried in the base.
Figure 9:
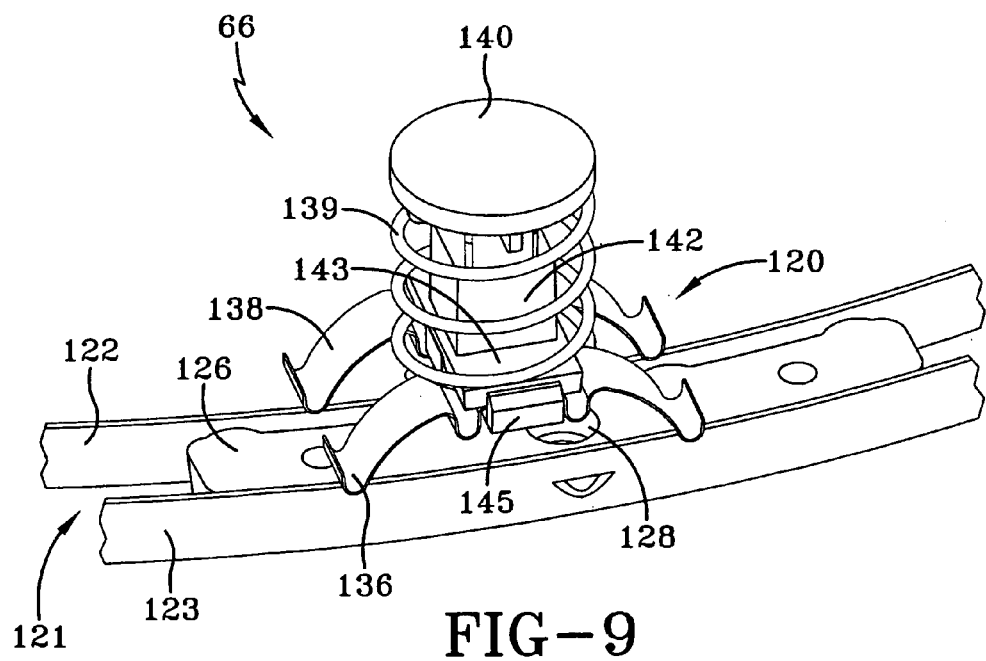
FIG. 9 is an isometric view of a weight sensor, depicted over the contact rails carried in the base.

The weight sensors 66 are depicted in FIGS. 8 and 9. Each sensor comprises a body 135, an opposed set of conductive spring feet 136, 138 and a compression spring 139. The body, in turn, is formed of two pieces, a head 140, having a square shaft 141, extending downwardly therefrom, and a T-shaped base 142, also square and which terminates in a cross-wise foot 143 (see FIG. 11A). The T-shaped base 142 is assembled from beneath the turntable 32, though a square aperture 144 (FIG. 6) and the head 140 is positioned from above the turntable after first installing the compression spring 139 about the shaft 141. The shaft 141 is fit within an accommodating passage formed in the base 142. Finally, the spring feet 136, 138 are connected by way of a flat shoe 145, of plastic or similar material, with a screw 146 which joins the shoe 145 to the base 142 and finally to the shaft 141. The shoe 145 is wider than the aperture 144 and prevents the sensor 66 from being removed from the turntable 32.

Figure 11C:
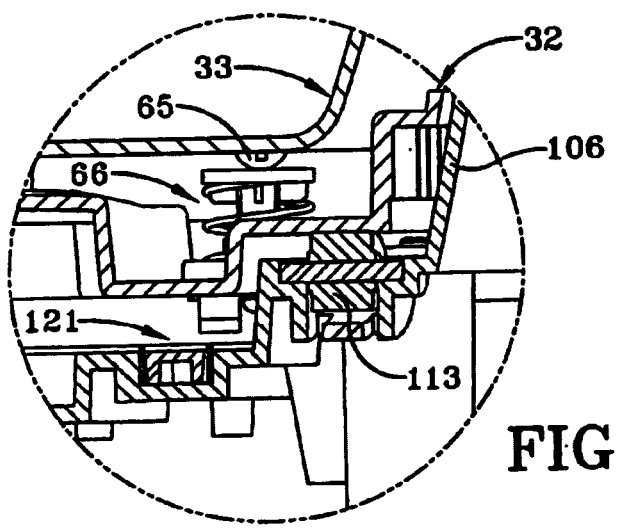
FIG. 11C is an enlarged cross-section of the area 11C, depicted in FIG. 11.

Two installed sensors 66 are depicted in FIG. 5, each being positioned on a platform 148 raised up within the trough 71. With reference to FIGS. 11C and 11A, the turntable 32 is presented, in cross-section, resting upon the rollers 113 and centered among the wheels 108. The buttons 65, carried on the underside of the litter pan 33 are depicted in contact with the head 140 from a sensor 66. In the positions shown the two make contact, however, the head has not been forced down, which would result in the spring feet 136, 138 contacting the rails 122, 123. When the apparatus 30 is not occupied by an animal, this is the normal or operational condition. The pan is balanced on the spindle 86, as previously described and is either stationary, or rotating during self-cleaning. Typically, a cleaning cycle is activated automatically after the expiration of a pre-set time, for instance, 30 minutes following the last activity in the apparatus. This ensures first that the pet has not decided to return and second, that the self-clumping litter has adequate time to solidify liquid waste, so that it can be readily removed from the litter as a solid mass.

At such time, the drive mechanism will be activated to clean the litter, as will be described hereinbelow. In operation, the weight of the animal in the pan is sufficient to cause it to tilt slightly about the spindle 86, e.g., approximately 2°, which causes one of the buttons 65 to engage an opposed head from sensor 66. If the buttons 65 are not employed on the pan 33, the pan may be required to tilt a little more until the underside of the pan is brought into contact with the head of a sensor 66. Contact with the head 140 causes the feet to make contact with the rails which sends a signal to a controller.

With reference to FIG. 7, the inner wall 106 of base 31 is shown, as is a port 150, through which a drive gear 151 partially extends, sufficient to engage ring gear 78 from the turntable 32 and thereby cause rotation of the turntable and litter pan 33, carried thereon. The drive mechanism will be described subsequently but at this point it is sufficient to note that when gear 151 is rotated counter clockwise, when viewed from above, the turntable will rotate in a clockwise direction, which begins and continues during a self-cleaning cycle. Concurrent with such rotation of the litter pan 33, the rake assembly 36 is driven in a clockwise direction through the litter in the rotating pan and eventually to deposit waste material into the waste receptacle of the apparatus, indicated generally by the numeral 37. The receptacle provides a separate container 153, having a floor 154 and a hinged door 155, which is automatically opened during a self-cleaning cycle.

Figure 12:
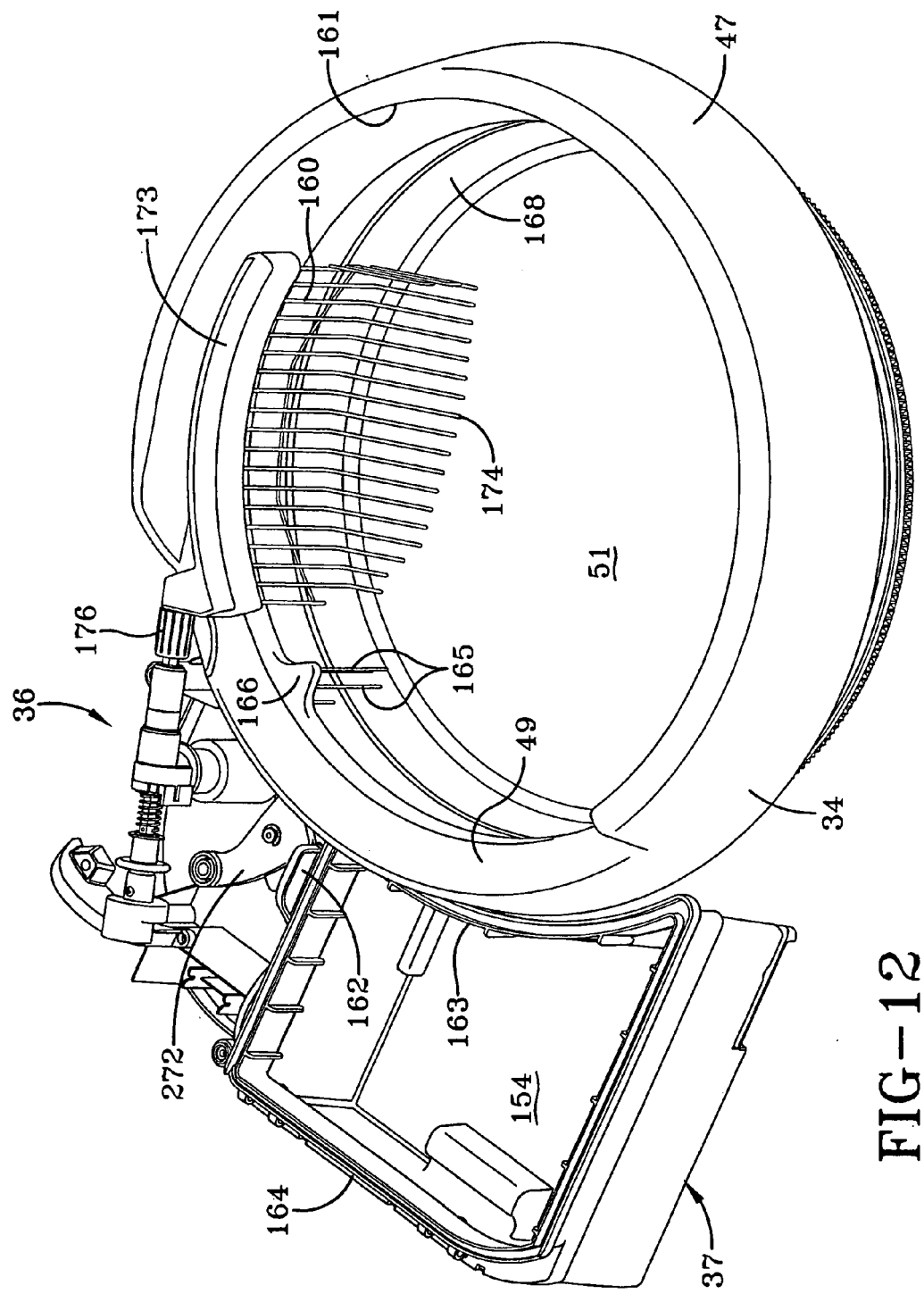
FIGS. 12–16 are isometric views of the litter apparatus of the present invention, depicting the rake sequentially moving from rest, through the litter pan, out of the litter pan and depositing waste litter material into the receptacle.

With reference next to FIGS. 1 and 12–16, the operation of the apparatus during a self-cleaning cycle will be discussed. For the sake of clarity no litter has been depicted in the litter pan 33. As is common in self-cleaning litter apparatus, a self-clumping litter is recommended and it operates by clumping liquid waste, e.g., urine, into a single mass, which can then be scooped away, much the same as solid waste. In FIGS. 1 and 12, the apparatus 30 is at rest. In this position, the tines from the rake 160 are almost contacting the bottom 51 of litter pan 33, where they are submerged in the litter to scoop beneath any clumps of waste material.

Figure 13:
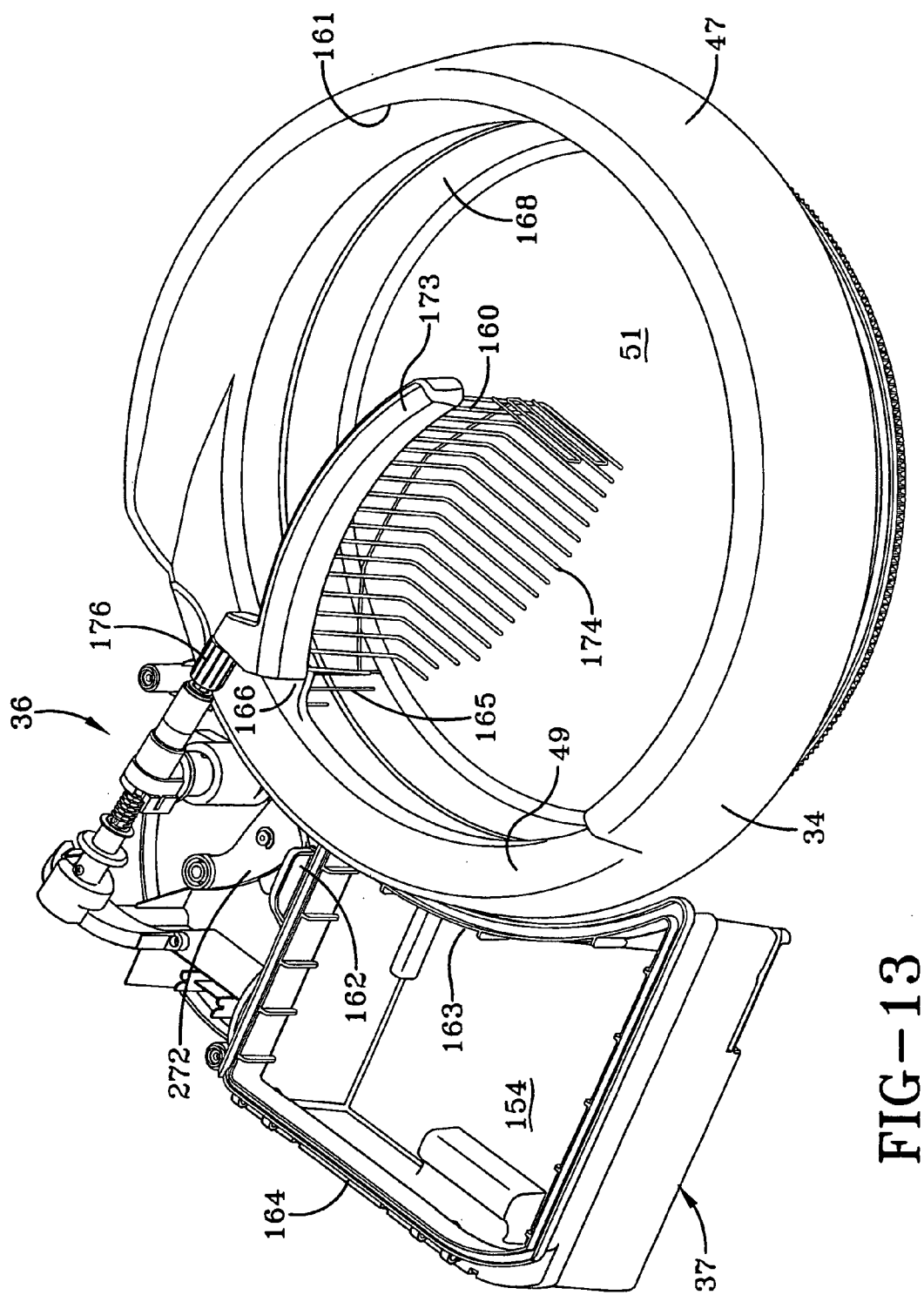
Figure 14:
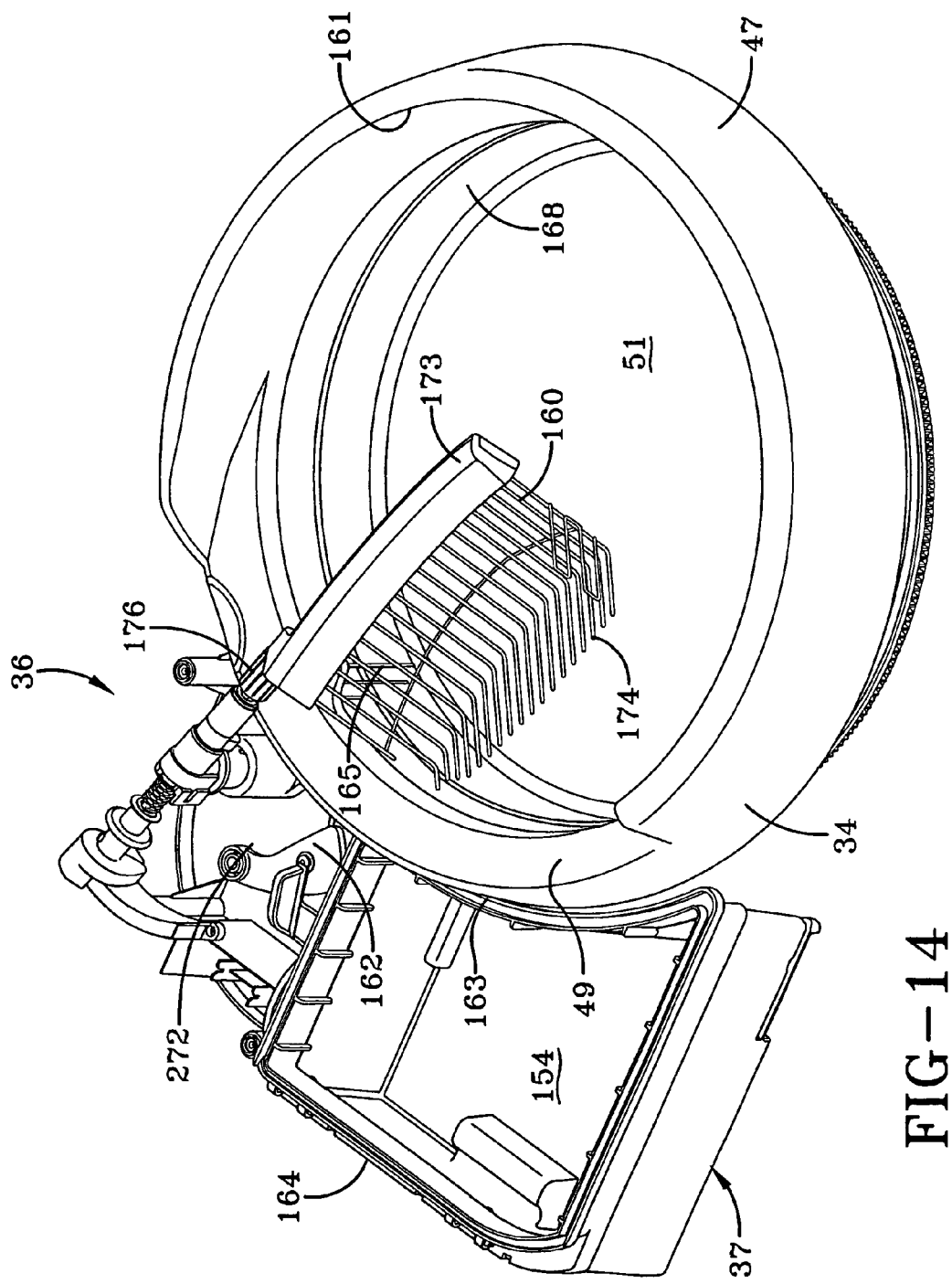

As the apparatus is cycled, which can either be controlled to operate automatically within a pre-set time of non-activity by the pet or, upon activation manually by the pet owner, the pan 33 is moving in its clockwise rotation and the rake assembly 36 is also moving in a clockwise fashion, arcuately across and through the pan. The assembly 36 moves from a rest or parked position, against the inner wall 161 of the shield 34, near the opening 48, proceeding in a countercurrent fashion through the litter, as depicted in FIG. 13. In FIGS. 12–16, the door 155 has been removed for clarity and a door pusher 162 is shown. Its movement will be described subsequently. In FIGS. 12 and 13, the door pusher has not begun to move and thus, the door 155 remains closed. In FIG. 14, as the rake assembly 36 continues its sweep through the litter, the door pusher 162 has begun upward movement, that is, it rotates from the entrance side 163 of the container, adjacent the shield 34, toward the opposite, hinged side 164 of the container. As this occurs, the door 155 (not shown) which rests on the pusher is likewise beginning to lift, opening the receptacle.

Figure 15:
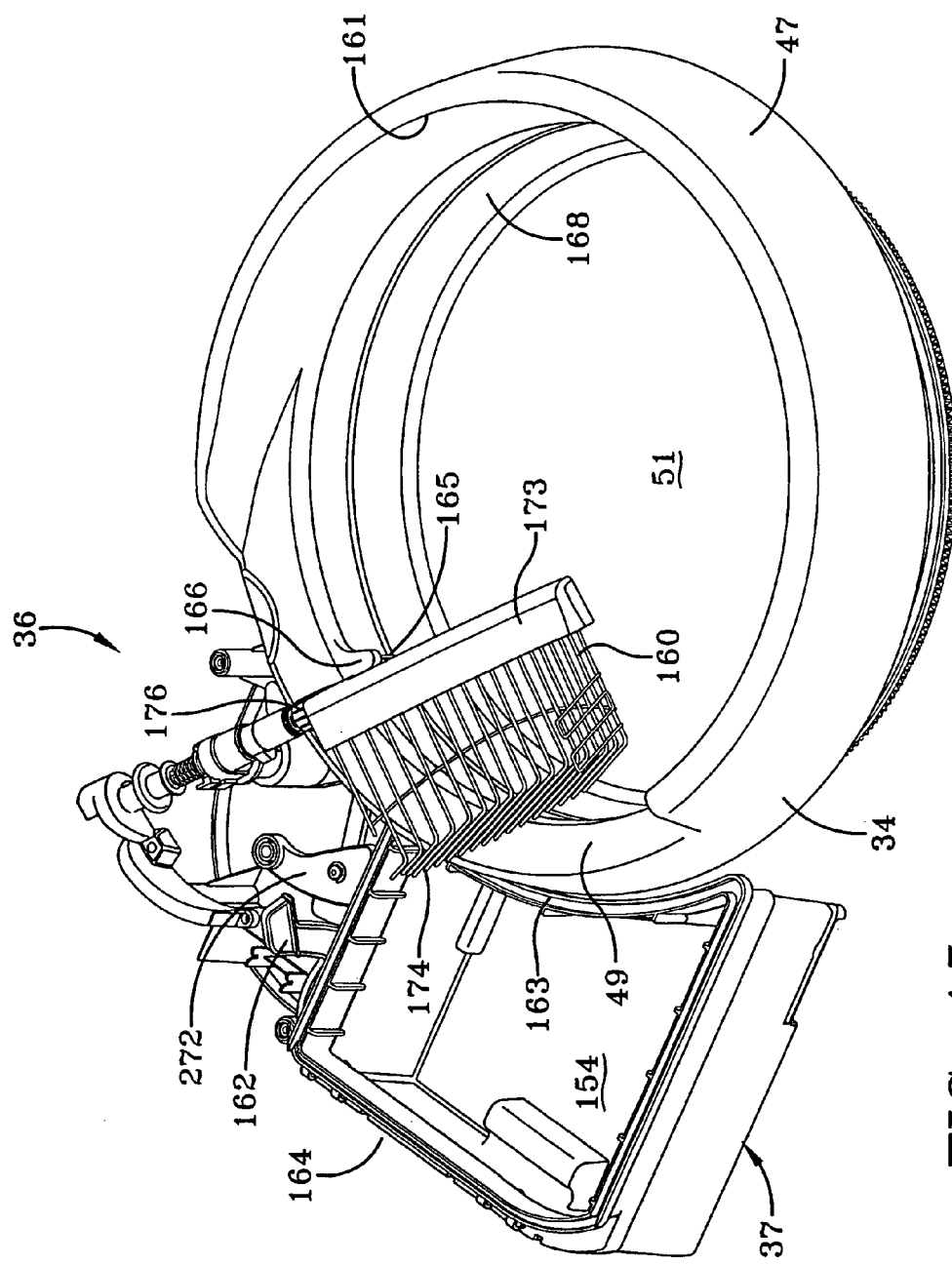

In FIG. 15, the rake 160 has lifted out of the litter pan 33 and has rotated upon its axis to hold waste clumps within the rake 160 and door pusher 162 has moved further upwardly. Finally, in FIG. 16, the rake has first moved directly over the receptacle 37 and then rotated all the way upon its axis, allowing gravity to free the waste and waste clumps from the tines and fall into the open container 153. The door pusher 162 is in its highest position and the door 155 will be completely open. At the end of this forward or first part of the cycle, the motor driving the mechanism is reversed, causing the retraction of the rake back into the litter pan, beneath the litter to its original resting position. While this reversal of the rake proceeds, the turntable is also reversed, to rotate counter-clockwise as the rake 160 moves downwardly through the litter and the door 155 is allowed to close.

While the foregoing explanation has referred to rotations in clockwise and counter-clockwise directions, such orientations are only applicable to the apparatus as shown in the drawings. Accordingly, it is to be understood that the specific directions of rotation do not constitute limitations on the practice of the present invention, as it will be appreciated that an apparatus manufactured as a mirror image of the apparatus 30, would operate in the opposite directions, as the pan and rake moved first from the parked position and later returned to the parked position.

In order to ensure that waste and waste clumps are driven toward the tines, several stationary tines 165 are provided from an extension 166 provided radially inwardly from the opening 148 in the shield. As the pan 33 rotates, any clumps that were deposited or formed near the inner wall 168 of the pan will, upon rotation in clockwise fashion, be driven radially inwardly upon contacting the stationary tines 165, where they will be in a path to be scooped away by the rake assembly 36. As will become apparent subsequently, the turntable and pan rotate at a significantly higher rpm than the counter rotation of the rake assembly. In this manner, essentially all of the waste material is driven into the path of the oncoming rake assembly before it actually makes its complete pass through the litter. Generally, it is preferred to have the pan rotate at approximately three and one-half times the arcuate rotation of the rake assembly 36, although ratios greater than or less than 3.5:1 are not necessarily precluded. What is important is that the ratio be high enough so that all or most of the waste material meets with the rake for removal from the pan.

Figure 20:
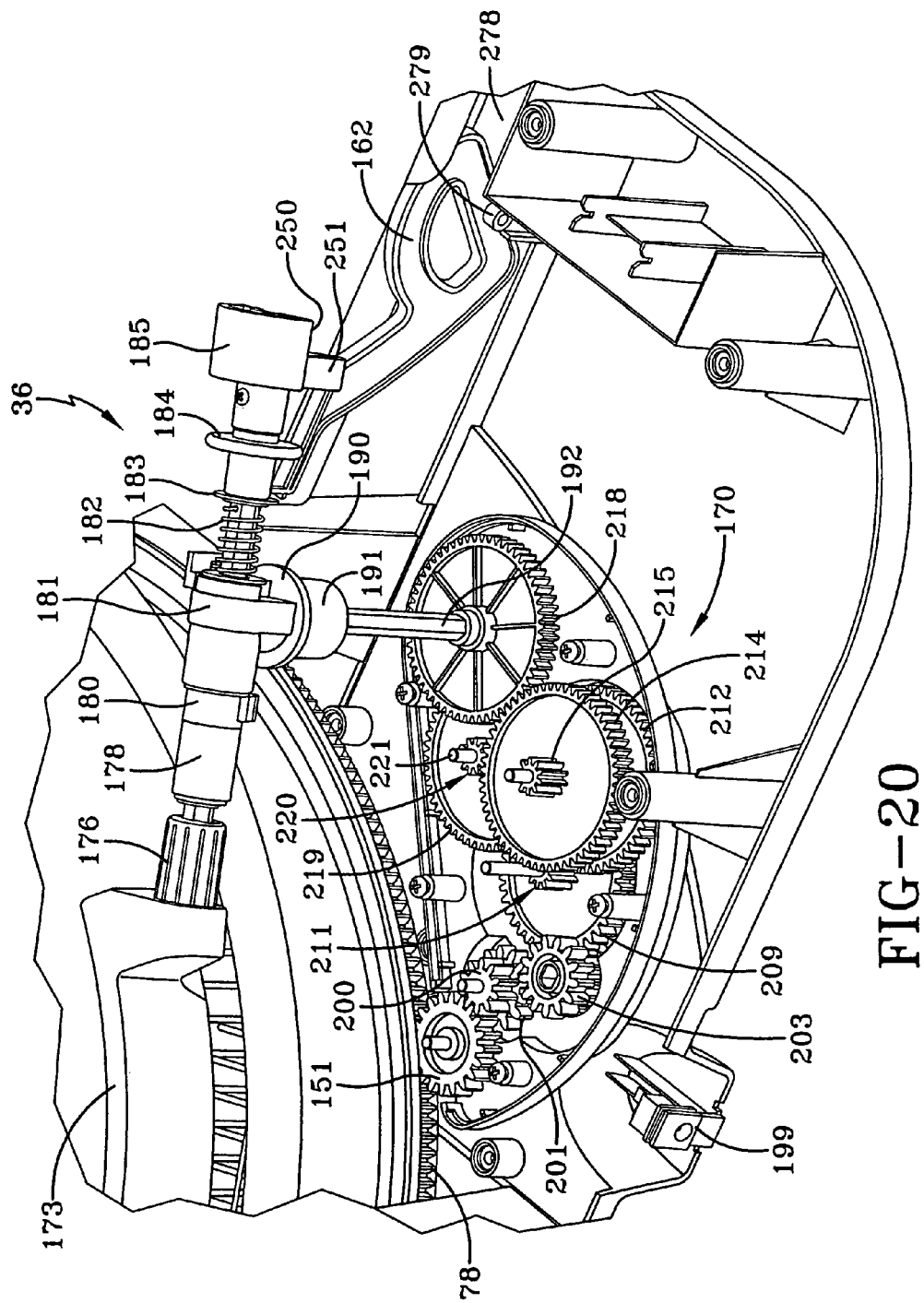
FIG. 20 is a partial isometric view, similar to FIG. 18, with components removed to reveal the drive mechanism and the rake assembly.
Figure 21:
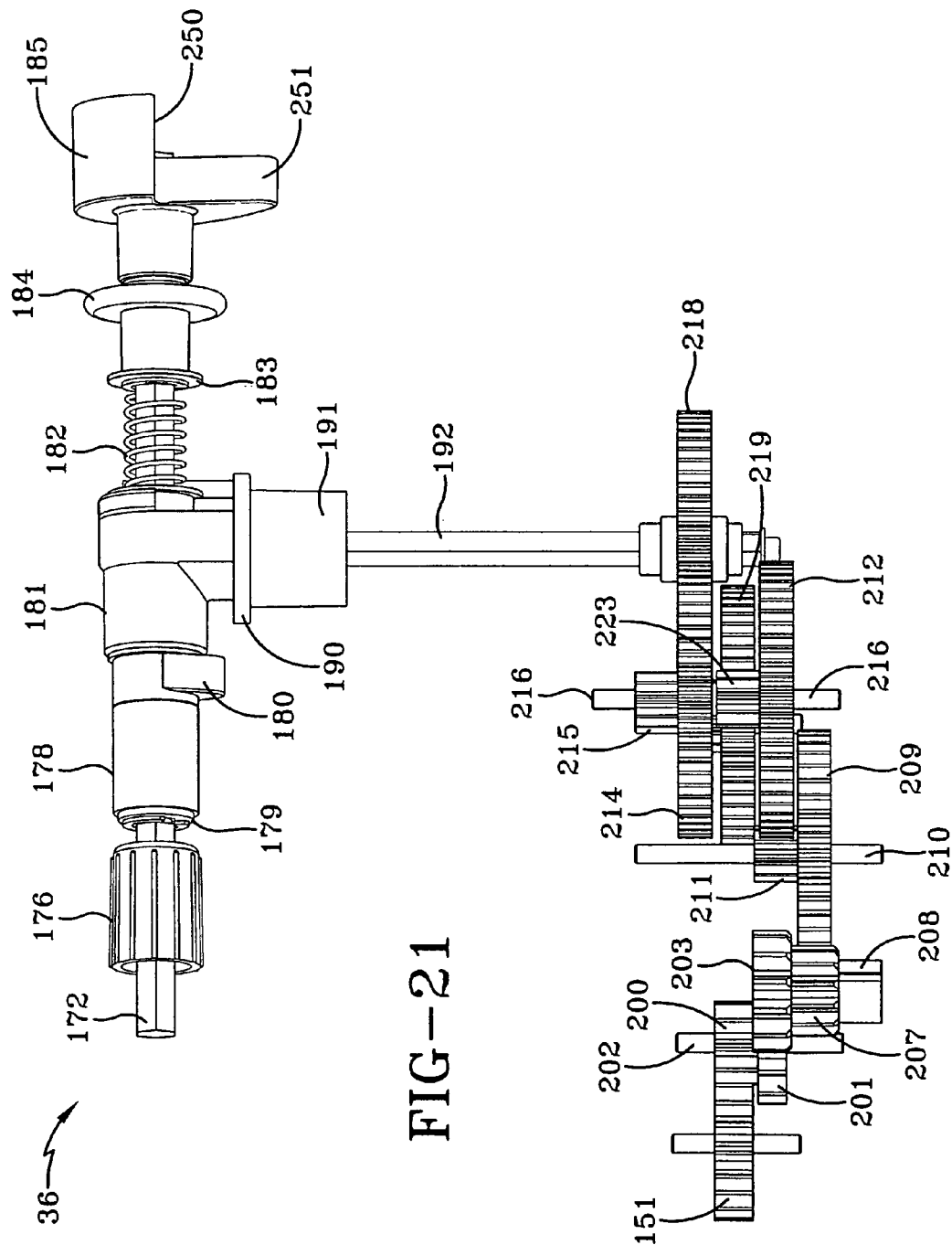
FIG. 21 is a side elevation of the rake assembly, separately from the apparatus and the drive mechanism positioned beneath the base.

Next, the rake assembly shall be described with specific reference to FIG. 21, which depicts a skeletonized structure of the rake assembly 36, which resides on the upper side of the apparatus 30 and the drive mechanism, indicated generally by the numeral 170, which is housed in the main base, more particularly, in the drive housing, indicated by the numeral 38. To protect the pet as well as the owner, the moving parts of the drive mechanism are located in the lower, inside portion of the main base, as depicted in FIG. 20, where the various components of the apparatus have been removed to reveal the relationship between the assembly 36 and mechanism 170.

The rake assembly 36 provides a central steel shaft 172, hexagonal in cross-section for the various components it carries. Beginning at the left end, as viewed in FIG. 21, the rake holder 173 is attached, which carries the rake 160, discussed hereinabove. The rake holder is semi-arcuate, of a lesser diameter than the shield 34, in order to fit closely to the inside wall 161 when the rake holder is in its parked or rest position. The tines of rake 160 are affixed to the underside of the holder and project straight down to almost the face 51 of litter pan 33 where they are then bent forward, parallel to the pan to form a flat scoop 174 (see FIG. 25). Several lateral tines 175 are affixed to the outermost end tine, to prevent waste materials from falling off the end of the scoop. The rake holder 173 is firmly joined to the shaft 172, with the rake lock 176. The rake holder can provide a bayonette-type of fitting to the shaft so that twisting the rake lock one-half turn will release the rake holder from the shaft for cleaning purposes as well as disassembly of the basic components of the apparatus.

The next component on the shaft is a small wheel 178, which is held in place with an e-ring 179. Adjacent the wheel is a small cam 180, followed next by the upper main driving shaft 181. A torsion spring 182 encircles the shaft 172 next and its two legs (not shown) are connected, one into the back of upper main driving shaft 181 and the other into a hole in shaft 172, biasing the shaft to rotate in clockwise fashion, as viewed in FIG. 21. Immediately adjacent the spring 182 is another e-ring 183, which holds a large wheel 184 in place on the shaft and at the far end of the shaft, is a key cam wheel 185.

Figure 19:
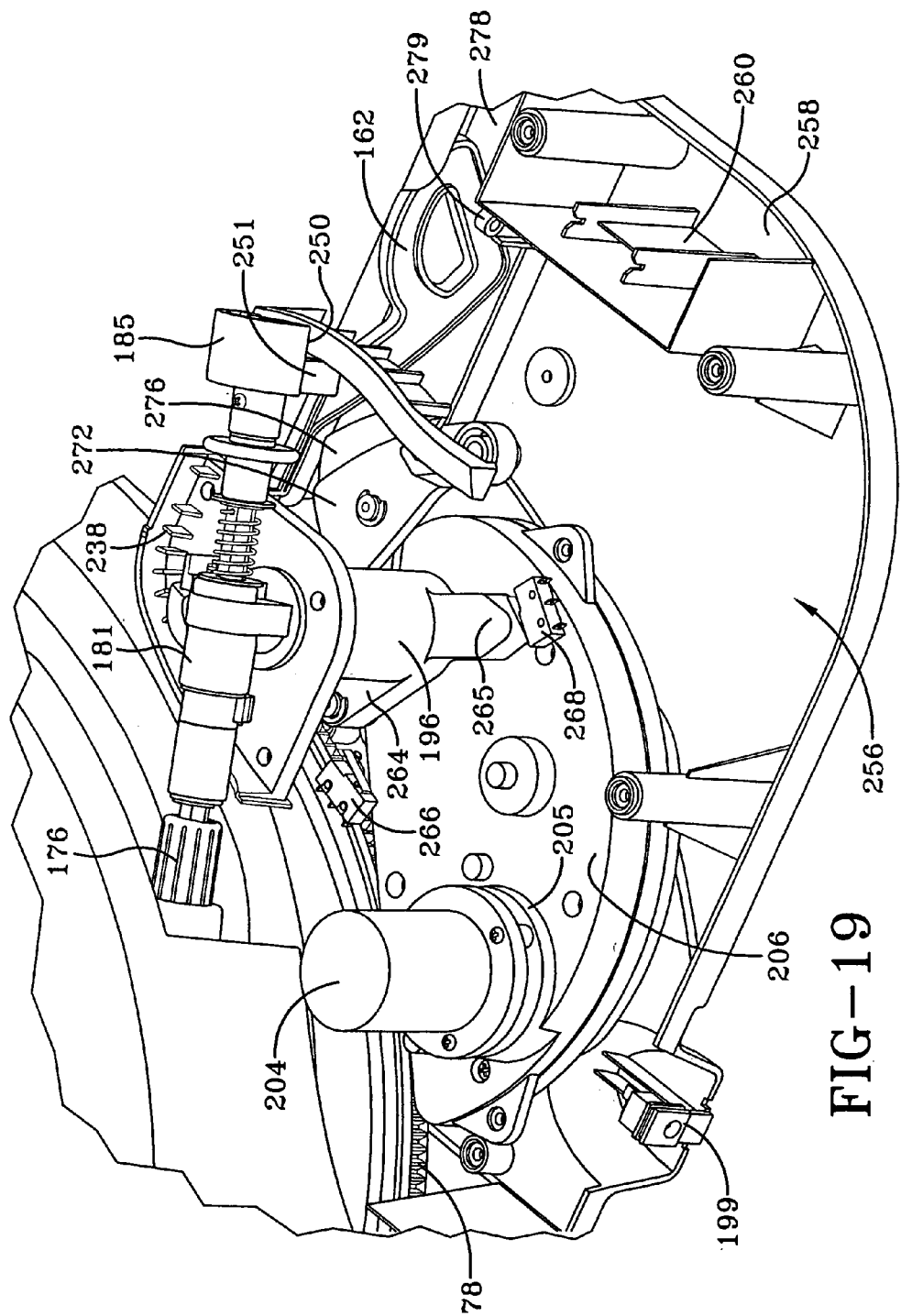
FIG. 19 is a partial isometric view, looking down and from the rear side of the apparatus, depicting the rake assembly in relation to the cam members for rotation of the rake and lifting the cover on the receptacle.

The upper main driving shaft 181 has a circular plate 190 at its midsection and a cylindrical base 191, into which a vertical, hexagonally-shaped steel shaft 192 is located. The base member 191 passes through an aperture in rake assembly base 193, as depicted in FIG. 19, the circular plate 190 providing a bearing surface for the rotation of upper main drive shaft 181 and related components upon the rake assembly base. The rake assembly base, in turn, is fastened to the upper floor 194 in drive housing 38 (see FIG. 22) and is accessible when the cover 195 (FIG. 1) is unfastened from housing 38. Beneath the rake assembly base and the floor 194, the lower main driving shaft 196 is attached to the steel shaft 192, which is visible in FIG. 23, where the floor 194 has been removed.

Returning to FIG. 21, the drive mechanism 170 provides a series of intermeshing gears as follows. Gear 151, at the far left of the drawing is the gear that drives ring gear 78 beneath the turntable 32. Meshing with it are gears 200 and 201, journalled to the same shaft 202. Gear 201 meshes with upper drive gear 203, which is driven by a motor 204, which is affixed to a mount 205, provided on upper gear housing 206, depicted in FIG. 25. A suitable motor is of the type usually found in cordless screw drivers, which are 12 volt, and run at approximately 10,000 to 12,000 rpm. A current source of such motors is Mabuchi or Gold Effort. Of course, other motors can be employed and may require a different ratio of gears. The motor is powered by a conventional 12 volt transformer and a power output jack can be plugged into a suitable receptacle, provided on the exterior of the main base 31, as at 199 (see FIGS. 22 and 25). As such means are well understood in the art, the transformer and related wiring necessary to operate the apparatus 30 have neither been depicted nor, described herein. Of course, the apparatus 30 could be provided with a battery compartment and battery, as an alternative source of power. Such devices are well known in the art and have not been depicted herein.

Beneath upper drive gear 203 is lower drive gear 207 and beneath gear 207 is a bushing 208. Lower drive gear 207 meshes with gear 209, journalled on shaft 210 and carrying gear 211. Gear 211 meshes with gear 212. Immediately above gear 212 is a small gear 213, then a large gear 214, and another small gear 215 all four being journalled on shaft 216. Large gear 214 meshes with gear 218, which drives the shaft 192 to rotate the rake assembly 36. Gear 213, in turn, meshes with gear 219, behind it and another small gear 220 is located above 219, both being journalled on a shaft 221, visible in FIG. 20. As will become apparent, the apparatus 30 operates from a single motor, as part of the drive mechanism 170, which concurrently rotates the pan 33, rotates the rake assembly and opens the cover 155 of waste receptacle 37. As viewed in FIG. 20, the various gears are mounted on a lower gear housing 222, itself mounted to the floor 223 of a lower compartment 224, which is housed within the main base 31, next to the waste receptacle 37.

Figure 17:
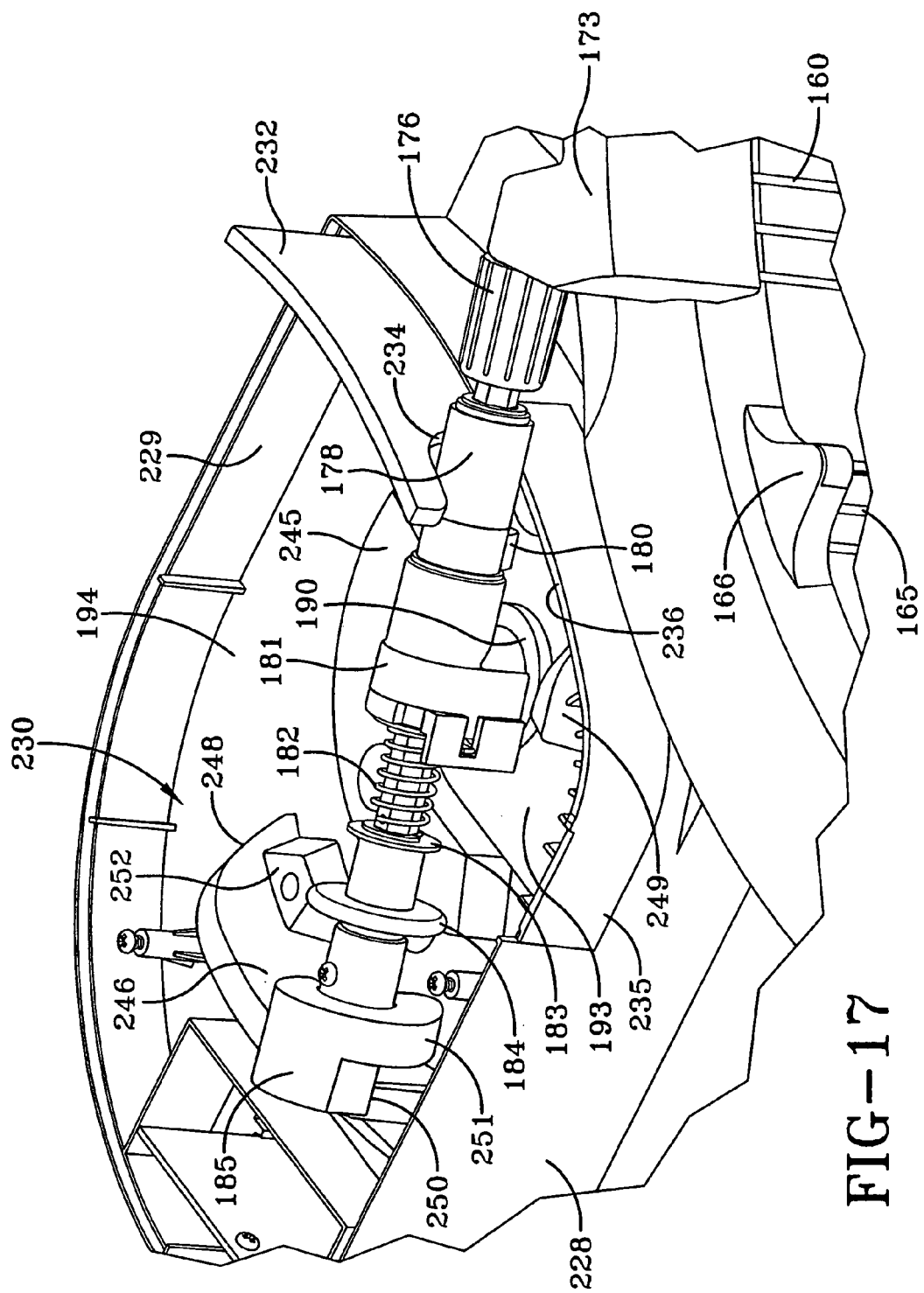
FIG. 17 is a partial isometric view, depicting the rake assembly.
Figure 18:
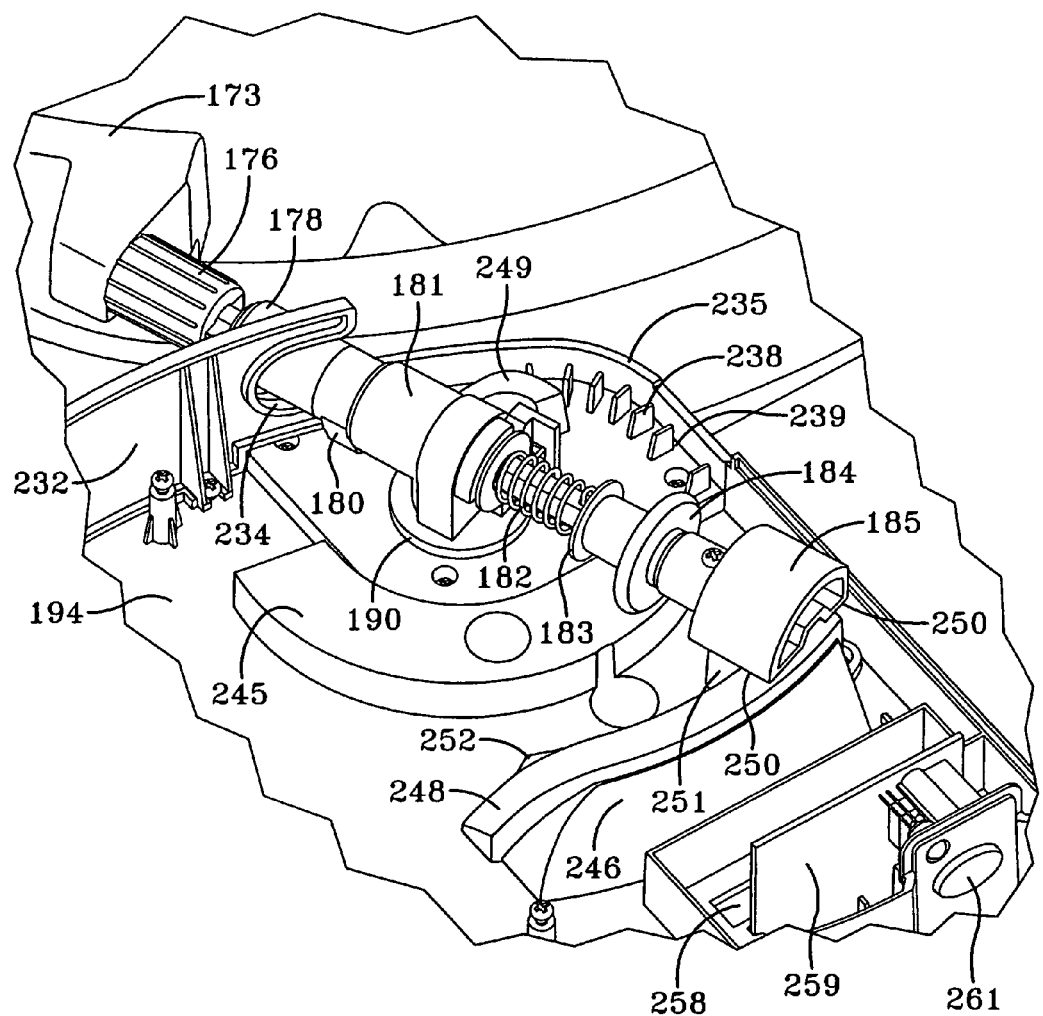
FIG. 18 is a partial isometric view, looking from the front of the apparatus, depicting the rake assembly in relation to the cam member for rotation of the rake.

In FIG. 17, the inboard and outboard side walls 228, 229, extending up from the drive housing 38 and surrounding around the floor 193, define an upper compartment, generally 230. Two removable gate guilders, 231 and 232 are provided at the front of the compartment 230. The guilder 232 is shown in FIG. 17 and provides a slot 234, to accommodate the small wheel 178 of assembly 36. A curvilinear front wall 235 of compartment 230, slightly lower than side walls 228, 229, provides an upper edge 236 along which the wheel 178 rolls. Inside of the front wall 235 are a series of vertical tabs 238 which follow the curvilinear contour of the wall, leaving a narrow channel 239, as depicted in FIG. 18, into which a flexible shield member 240 is positioned (see FIG. 22).

The shield 240 can be a length of clear plastic material and is provided with a hole 241 of sufficient diameter to receive the wheel 178 of rake assembly 36. Although not shown in the drawings, the cover 195 also provides a continuous sidewall which mates with the sidewalls 228, 229. The front portion of the sidewall of cover 195 is also curvilinear and the cover provides another series of tabs, similar to the tabs 238, and another channel is formed. When fully assembled, the shield member 240 is positioned between the two channels and slides therein as the rake assembly traverses from the parked position in the litter pan to the dumping position over the waste receptacle. Its purpose is to minimize the entrance of dust or litter grains from the litter pan into the compartment 230.

Figure 22:
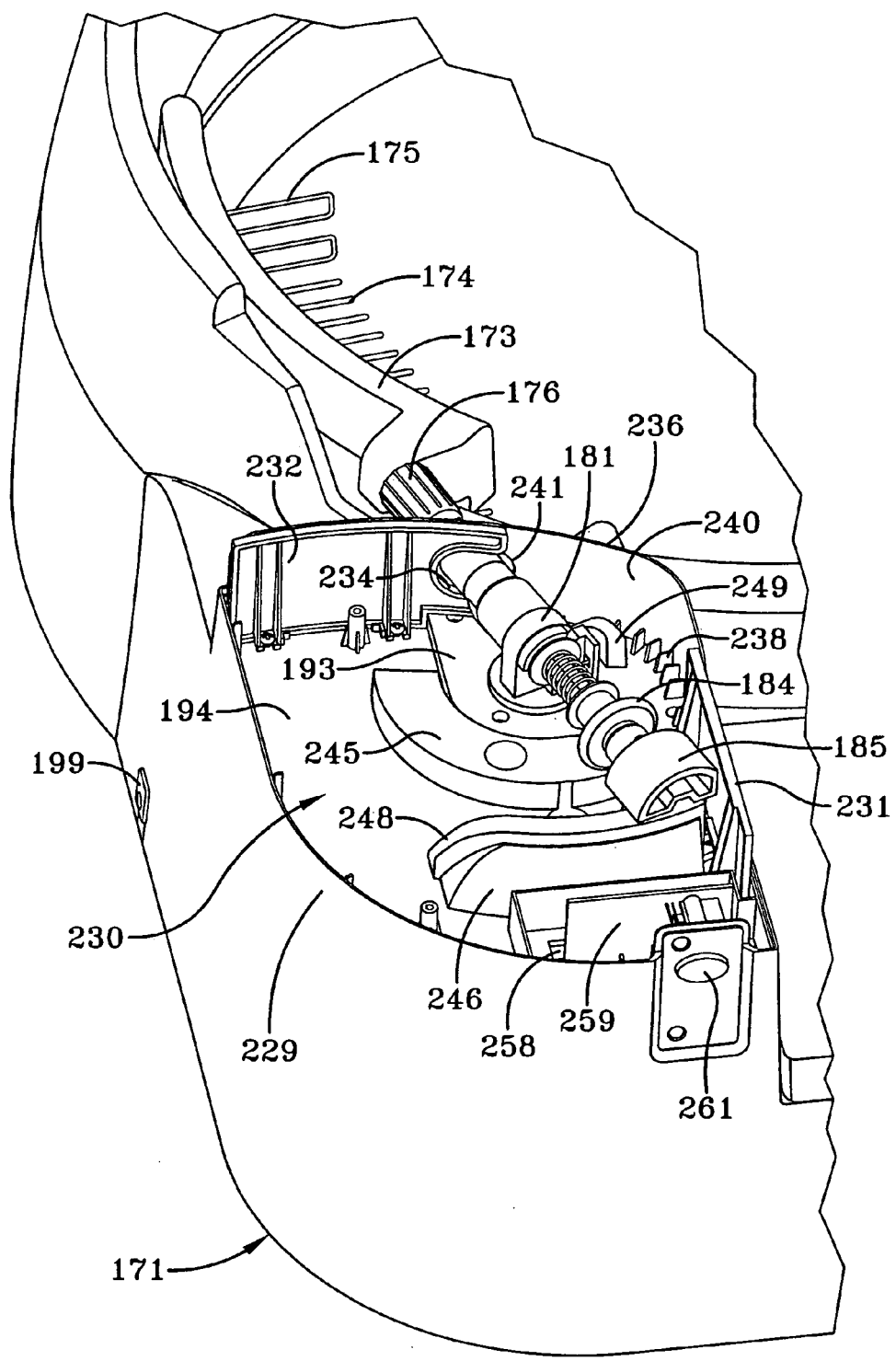
FIG. 22 is a partial isometric view, looking down and from the rear side of the apparatus, depicting the rake assembly and the rake at rest.
Figure 23:
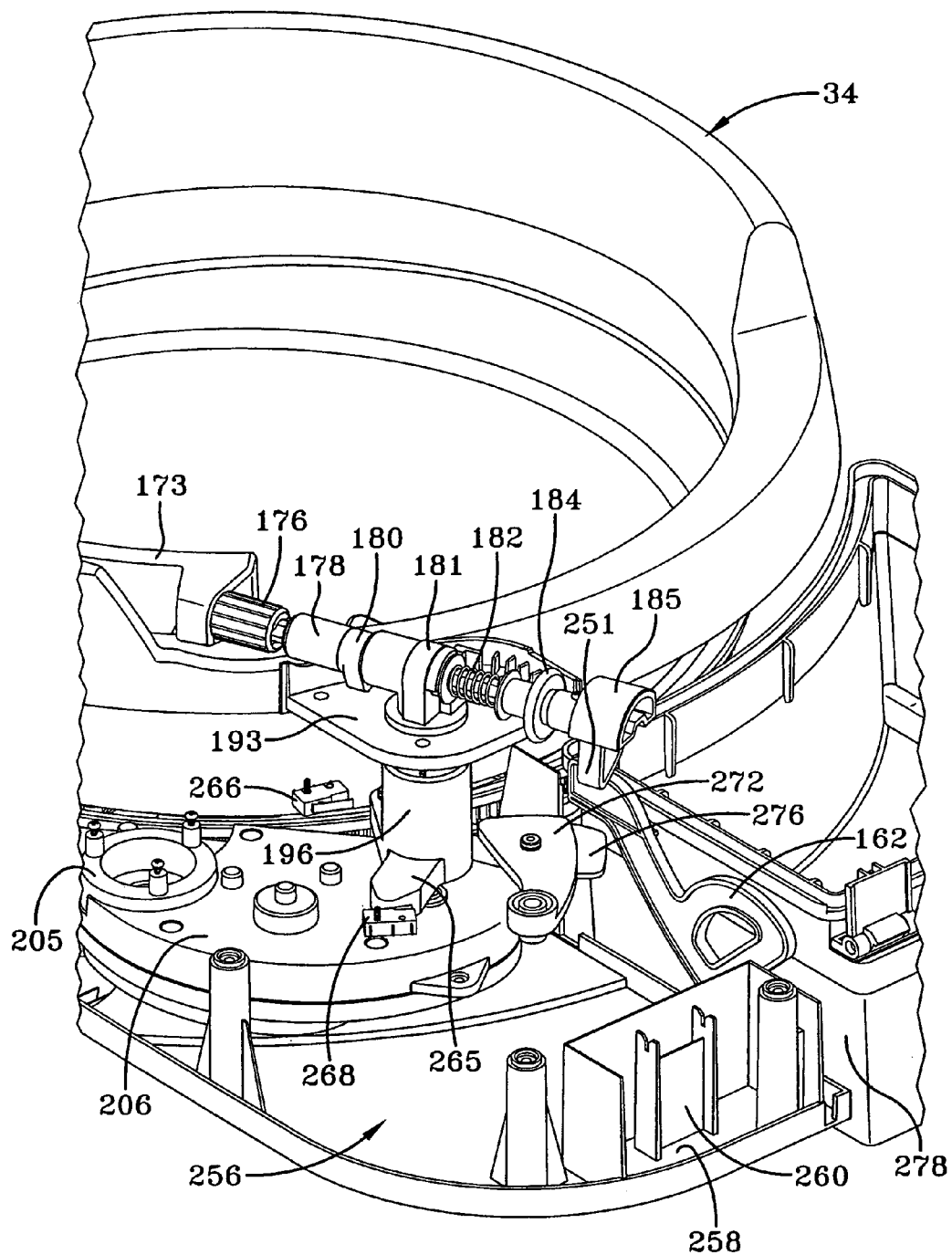
FIG. 23 is a partial isometric view, looking down and from the rear side of the apparatus, depicting the rake assembly and the rake at rest.

Referring now to FIGS. 17 and 22, adjacent the rake assembly base 193, a arcuate platform 245 is provided on the floor 194 of compartment 230. The arc traversed is approximately 90° and the platform is raised sufficiently to contact the large wheel 184 of rake assembly 36 in order to provide support for the rake holder 173 as it traverses the litter, carrying waste material. Behind platform 245 a second platform 246 is provided, higher than platform 245. Unlike the former, which has only a flat upper surface, the platform 246 has a generally flat upper surface, transitioning to a downward ramp 248 which curves toward and joins the floor 194. A third platform 249 is provided on the rake assembly base 193, in front of the first platform 245. Platform 249 has a ramped upper surface which begins at the rake assembly base and rises to approximately the height of the first platform 245. It is, however, considerably shorter in length than the first two platforms.

Figure 16:
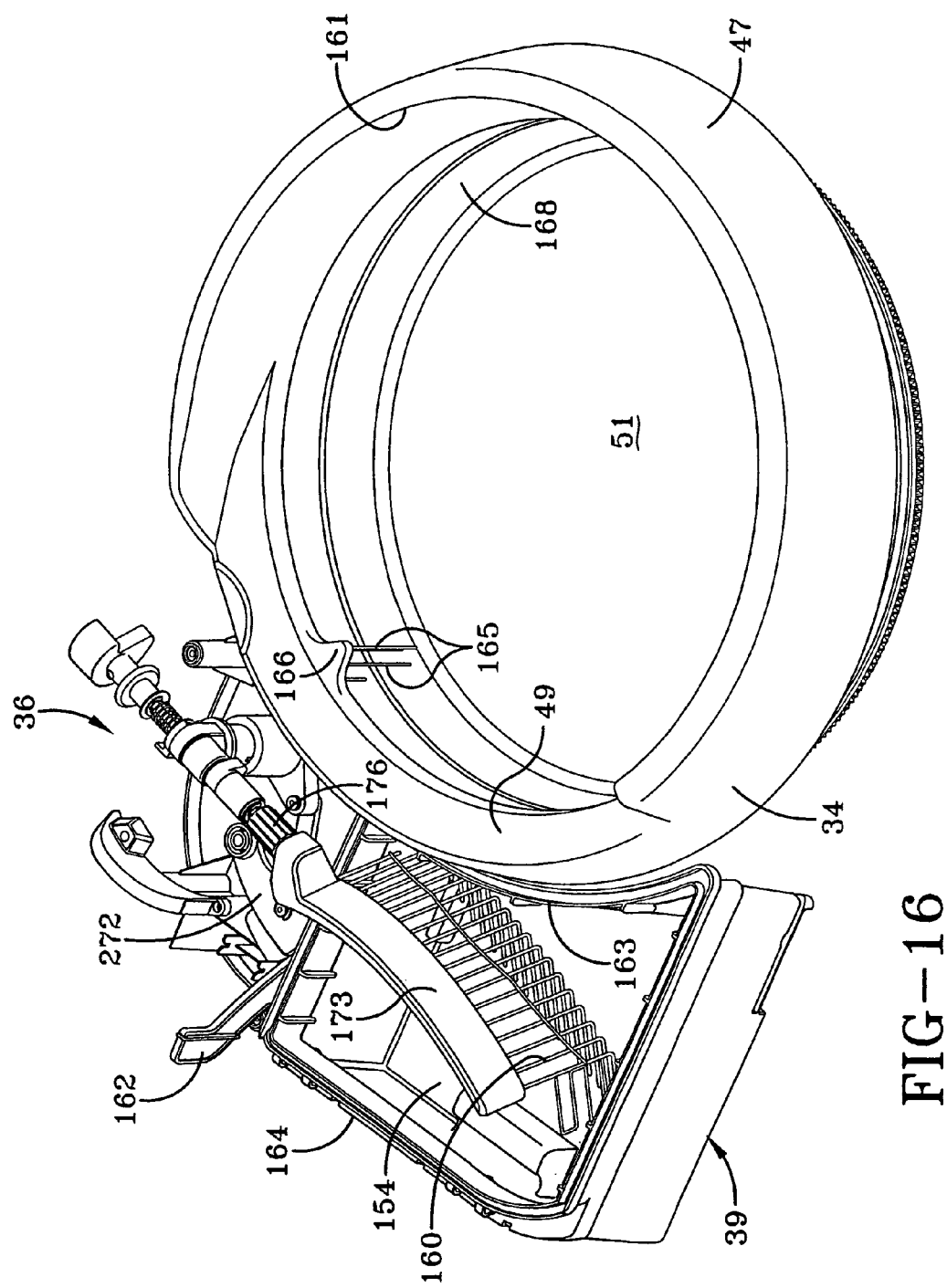

The key cam wheel 185 at the opposite end of rake holder 173 has a rounded top and flat underside 250 which rides along the surface of the second platform 246. Extending downwardly from the underside 250 is a cam 251, which is engageable with a step 252, along side of and integral with the second platform 246. As the rake holder 173 begins its sweep across the litter pan, an edge of the underside 250 from cam wheel 185 is passed along the horizontal surface of platform 246, moving from the rest position, depicted in FIG. 12. Just prior to the position depicted in FIG. 13, the cam 251 begins to contact the step 252, which starts an upward rotation of the rake holder 173, into a waste holding position. At this point, a minor rotation of the main driving shaft 181 occurs so that the opposite edge of the underside 250 from cam wheel 185 contacts the horizontal surface of platform 246. With the rotation of the rake holder 173, it is elevated out of the pan 33, to clear the shield 34 and eventually empty its contents into the waste receptacle 37, as depicted in FIGS. 14–16. Along the way, the cam wheel 185 is freed from the platform 246. Toward the end of the forward cycle, the small cam 180 makes contact with the third platform 249. As the cam 180 follows the ramp on platform 249, it is rotated which, in turn, rotates the rake holder 173 in a counter-clockwise direction, as viewed from the distal end, so that the contents carried by the scoop 175 are emptied into the waste receptacle 37, as depicted schematically in FIG. 16.

For the return cycle, the drive mechanism 170 is reversed, causing the rake holder 173 to move out of the waste receptacle toward a position of rest in the litter pan. Initial movement rotates the rake holder 173 sufficiently to clear the receptacle as the cam 180 retraces its movement over the third platform 249. Continued rotation of the upper main driving shaft 181 causes the cam 251 to engage the second platform 246, whereby the rake holder 173 is again returned to its leveled, or scooping position in the litter contained in the pan 33. The torsion spring 182 assists here, biasing the rake holder 173 counter-clockwise so that the flat scoop 174 is driven into the litter. Thereafter, the driving shaft 181 concludes its rotation until the rake holder 173 is parked in its initial rest position.

The floor 194 and sidewall 229 of drive housing 38 are removable as a unit and together house a lower compartment, generally 256, of the base 31. Behind the second platform 246 is a small compartment 258, which receives a controller 259 for operation of the apparatus 30. The compartment 258 extends into the lower compartment and provides a slot holder 260, housed within the base 31. A control button 261 is provided for manual operation of the apparatus. One embodiment of apparatus is fully self-cleaning, by which is meant that the cleaning cycle being described occurs without intervention by the pet owner. Nonetheless, should the pet owner wish to initiate a cycle, the power button 261 can be activated. The apparatus 30 can also be manufactured as a manual duty device, in which instance, the circuit board is not programmed to initiate a self-cleaning cycle automatically but rather the pet owner can do so upon demand. It is to be understood that while a button is depicted, the apparatus could also be provided with a foot control switch or a remote switch. Other means of automatic activation could be initiated from a micro-chip, embedded in the collar worn by the pet. None of the foregoing devices are depicted or described, as they are well known in the art.

With reference to FIG. 19, the lower compartment 256 is exposed and reference should be made to the lower main driving shaft 196. It is to be appreciated that several upper components have been removed to reveal elements in the lower compartment 256 and in so doing, several of the remaining elements depicted appear to be floating. At the lower end of base 196, an inwardly directed link arm 264 extends radially out and an outwardly directed cam 265 extends radially out, approximately 165° from the link arm. The cam 265 is engage able with opposed inboard and outboard limit switches, 266 and 268, respectively. Both switches are mounted to struts, not shown, that are provided in the underside of the floor 194, which has been removed. The inboard switch 266 functions to reverse the cleaning of the pan (FIG. 16) so that the rake assembly 36 returns to its parked position (FIG. 12). The outboard switch 268 signals the apparatus to stop movement, until the next cleaning cycle is to be activated.

Figure 24:
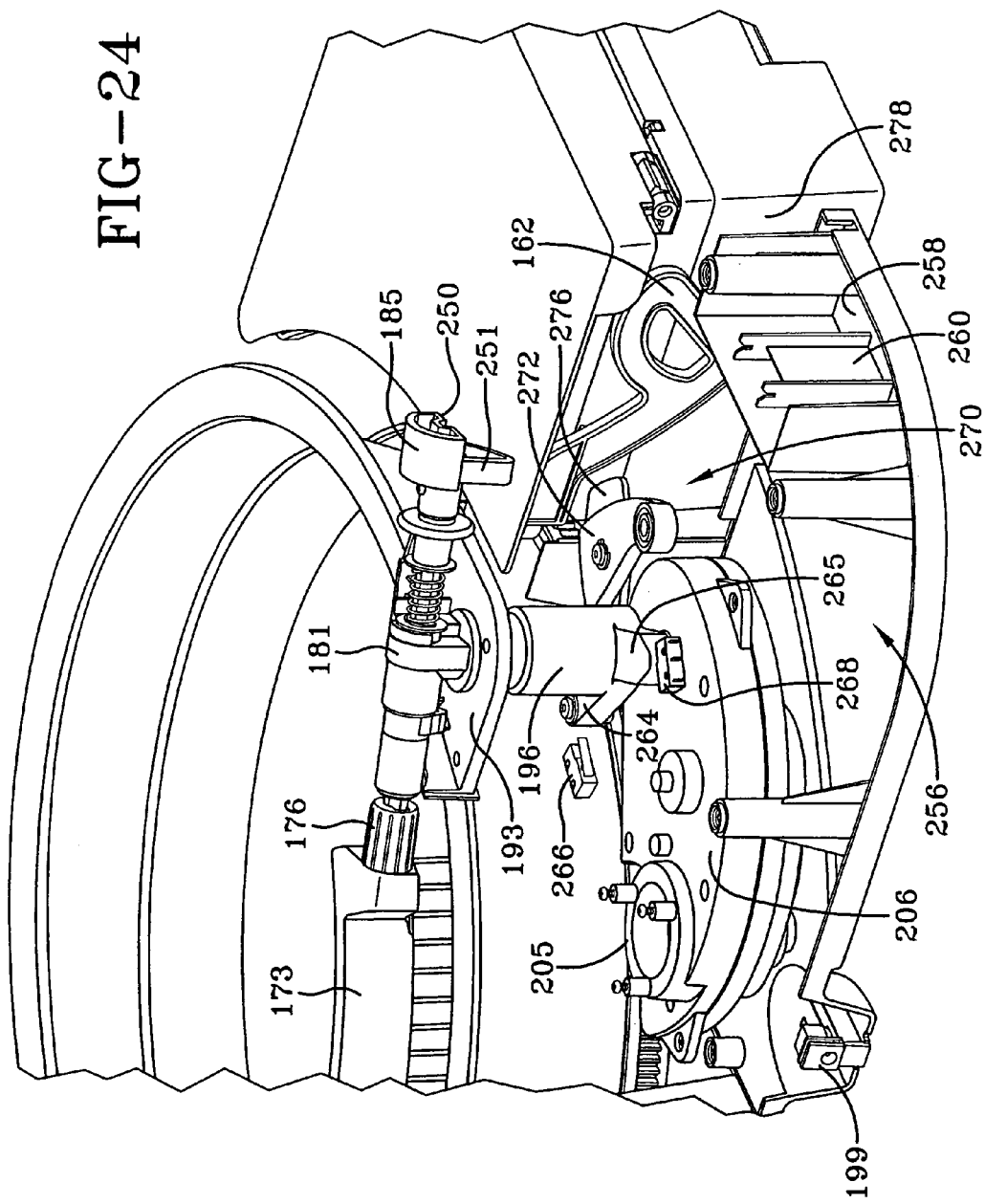
FIG. 24 is a partial isometric view, looking from the rear side of the apparatus, depicting the rake assembly and rake at rest with the receptacle cover closed.

With reference next to FIGS. 10 and 24, the mechanism for opening the waste receptacle, which is indicated generally by the numeral 270, will be described. It includes a link arm 271, a lever 272, and the door pusher 162, described previously. These work in conjunction with the inwardly directed link arm 264. One end of the link arm 271 is pivotally connected to the inwardly directed link arm 264, at 273. The other end is connected to the lever 272 at 274, and the lever 272 is itself pivotally connected at 275 to the underside of the floor 194.

Figure 25:
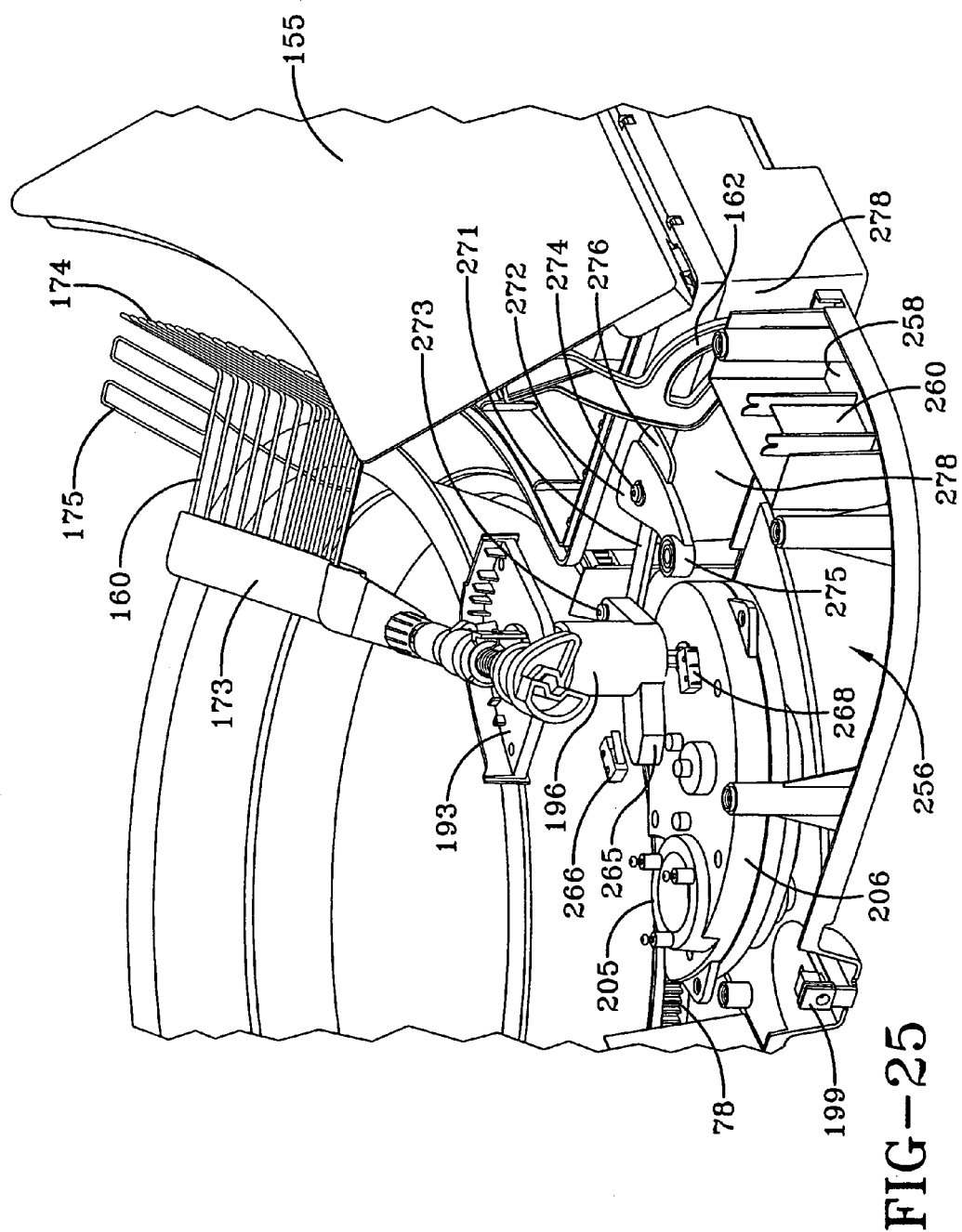
FIG. 25 is a partial isometric view, similar to FIG. 24, with the receptacle cover opening for receipt of litter waste.
Figure 26:
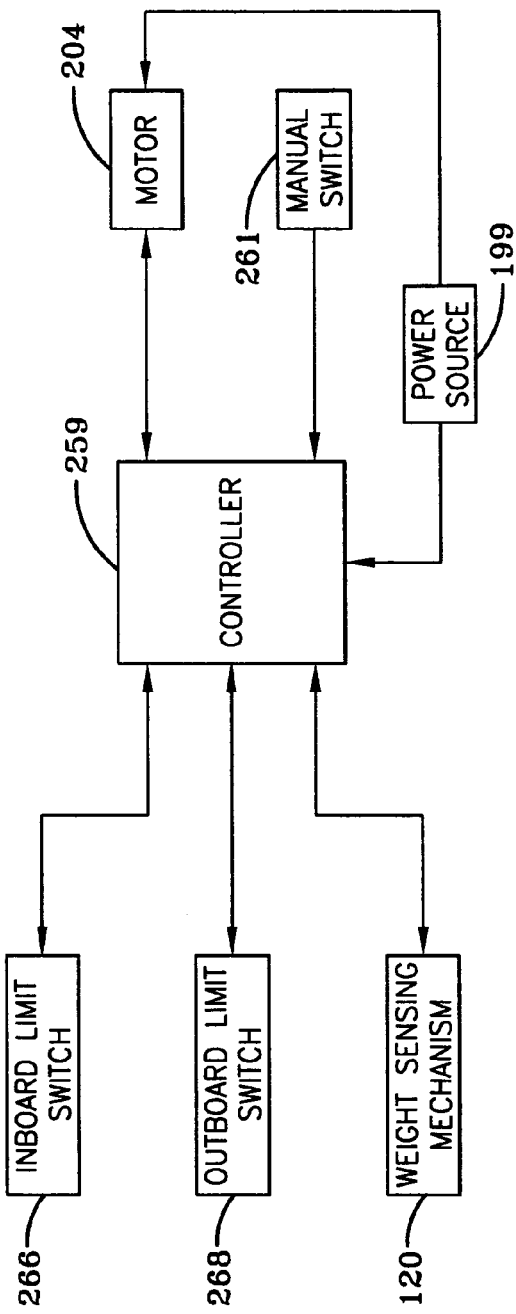
FIG. 26 is a block diagram of the control and sensors for the litter apparatus.
Figure 27:
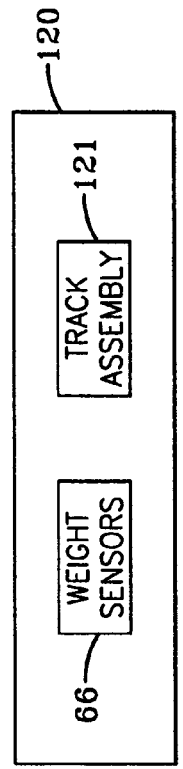
FIG. 27 is a block diagram of the weight sensing mechanism.

As the inwardly directed link arm 264 is rotated during the forward movement (cleaning) of an operation cycle, the link arm 271 urges the lever 272 to move rearwardly, as viewed in FIG. 25. A cam 276, provided by the lever 272 engages the underside of door pusher 162, which begins to rise. The pusher 162 is pivotally mounted to a wall 278 of the waste receptacle 37 at 279. In FIG. 25, the engagement of the door pusher 162 with the waste receptacle cover 155, as it is being lifted, is depicted. The various stages of upward movement of the door pusher 162 are also apparent in the sequential views, FIGS. 12–16, described hereinabove, where the cover had been removed for clarity.

General Operation

Having described the components of the apparatus 30, a general discussion of the self-cleaning cycle follows. Normally, the apparatus is at rest, which occurs whenever the apparatus has been filled with litter, turned on and is awaiting use by the pet. When the pet enters the apparatus, beginning at the ramp 39 and entering into the litter pan 33, the weight of the animal depresses the turntable 32, so that one of the weight sensors 66 makes contact with the rails 122, 123. In other words, the weight sensing mechanism 120; which comprises the weight sensors and the track assembly 121, is provided for the actuation of a petinitiated cleaning cycle. The controller is preferably programmed to signal the timer after the weight of the animal has engaged a weight sensor with the rails for a minimum of 3 to 5 seconds. In other words, a brief contact between the sensor and rails will not cause a cycle to be initiated, because the pet would not have used the litter box. After the animal concludes its business and exits the apparatus, the turntable is again fully righted upon the spindle 86 and a signal is generated to the controller 259 to begin activation of a cleaning cycle, within a pre-determined time. Recognizing that the pet may return, a sufficient period is usually 30 minutes. Additionally, the apparatus employs self-clumping litter, which requires several minutes to absorb liquid waste and form a solid having sufficient integrity to be moved. Once begun, a cycle is completed in approximately two minutes and during this period, the sensors are no longer active.

The controller 259 is a micro-processor based device that includes the necessary hardware, timer, software and memory for executing and performing the various functions of the apparatus 30. As will be described, the controller receives a number of electrical inputs from certain components and, depending upon the sequence of their receipt, generates electrical output signals to those components from which input signals were received and other components. The controller 259 receives electrical power from the power source 199 which may be either from an AC residential power supply, DC batteries or the like. The controller 259 may receive a cycle input from a switch 261. Once energized, the controller is able to receive input from the weight sensing mechanism 120, as well as an inboard limit switch 266 and an outboard limit switch 268. And the controller 259 is then able to control operation of a motor 204 which in turn operates the turntable as previously described. The motor 204 also receives power from the power source 199. It will be appreciated that the motor 199 may receive power from a separate power source that is of a different value or different format, than received by the controller. Or the controller 259 may directly supply power to the motor that is stepped-up or stepped-down an appropriate amount.

Returning now to the operation of the apparatus, the controller 259 includes an internal timer that is actuated upon exiting of the animal. Once this time has passed, the motor is energized and as a result three movements are commenced by the controller 259—the litter pan 33 is rotated clockwise and counter-clockwise, the rake assembly 36 begins a slower rotation through the litter and litter pan 33, and the cover of the waste receptacle 37 is raised.

Following one-half completion of the cycle, where the scoop 174 has deposited litter clumps and solid waste matter into the receptacle 37, the inboard limit switch 266 is activated by the inwardly directed link arm 264, from lower main driving shaft 196, which sends another signal to the controller to reverse rotation of the motor. As this occurs, the rake assembly withdraws from the receptacle 37, the cover is closed and the assembly moves down into the litter as it simultaneously rotates back (counter-clockwise, as shown) to its parked position, with the scoop 174 submerged in the litter. Concurrently, the litter pan and turntable are also rotating in a clockwise direction, as shown. When the outwardly directed cam 265 from the upper main driving shaft 181 contacts outboard limit switch 266, a signal is sent to the controller. While the rake has almost returned to its parked position, the forward motion of a new cycle is commenced and run for approximately 2 seconds. The effect of this action is that the backlash is taken up from the gears of the drive mechanism and as a result, the rake is actually moved rearwardly the last remaining increment to its fully parked position against or very near to the wall inner wall 161 of dust shield 42. Once the cycle is complete, all further movement ceases until either another cycle is initiated by the pet or, the owner elects to cycle the apparatus manually by activating the switch 261 or similar control switch.

Another feature of the apparatus, which is programmed into the controller, is a motor overload circuit. During a cycle, should the rake encounter an obstruction that the motor cannot overcome, the amperage to the motor will increase until an overload switch signals the controller to reverse the drive mechanism. Such switches, or overload protectors, are known in the art and do not constitute a limitation of the apparatus. Typically, a clump of solidified waste may have adhered to the surface of the pan, perhaps due to low litter volume and the clump may have a mass that cannot be immediately moved by the rake. By design and programming, the rake will return to its parked position and in several seconds a new cycle will commence. Generally, a second pass at the large clump or other obstruction is sufficient to remove or move it and the cycle continues. If not, a third park and re-initiation is programmed and if that attempt is still unsuccessful, the rake returns to rest or park and the apparatus is shut-down. A red LED or similar indicator is activated by the controller to provide a visual signal to the pet owner that the apparatus is unable to operate a cleaning cycle. The owner can then determine the nature of the problem and correct it so that the cycle can then be performed. In this instance, it is likely the owner would then initiate a cycle manually, to view operation and confirm that the previous problem no longer exists.

As noted hereinabove, an embodiment of the apparatus 30 is also within the scope of the invention which does not self-clean automatically, that is, when the pet leaves the apparatus. To initiate self-cleaning, the pet owner decides when by pushing the button 261 or similar switch and the apparatus proceeds to follow the cycle just described. Such apparatus would not employ the sensing mechanism 120 and, because a tiltable litter pan would not be required, the turntable could also be eliminated, in which instance the pan would be driven directly.

Thus, it should be evident that the apparatus and method of the present invention are effective for self-cleaning of litter devices, employing rotatable litter pans. Although the foregoing explanation has been directed to the apparatus depicted in the drawings, it will be appreciated by those skilled in the art, that certain components could be varied or modified to obtain the same operation. One such modification envisioned is the combination of the turntable and litter pan into a single component, rather than two separate components. Another modification is in the sensing mechanism 120. As described in the drawings, sensors are provided in the turntable and rails in the base, so that contact can be made. However, the location could be reversed, by placing the rails or similar elements in the turntable which would be engageable with sensors from beneath. So long as the tilting of the pan provides a signal to the controller to activate the drive mechanism, the relative position of the necessary components can be varied to suit manufacturing as well as consumer preferences.

Based upon the foregoing disclosure, it should now be apparent that the use of the litter apparatus described herein will carry out the objects set forth hereinabove. It is, therefore, to be understood that any variations evident fall within the scope of the claimed invention and thus, the selection of specific component elements can be determined without departing from the spirit of the invention herein disclosed and described. Thus, the scope of the invention shall include all modifications and variations that may fall within the scope of the attached claims.

I claim:

1. A self-cleaning cat litter apparatus that separates and extracts clumped litter waste material from litter material contained therein during use, comprising:
    a chamber adapted to contain a quantity of litter material;
    said chamber being rotatable about a centrally disposed vertical axis;
    a rake disposed within said chamber, said rake including a plurality of tines for receiving clumped litter waste material from the litter material and for extracting the received clumped litter waste material from said chamber, said rake being rotatable about a vertical axis, said rake vertical axis being spaced apart from and parallel to said chamber vertical axis; and
    a drive assembly simultaneously rotating said chamber about said chamber vertical axis and rotating said rake tines through the litter material while said rake is disposed in said chamber about said rake vertical axis, such that said rake sweeps within said chamber and through the litter material while said chamber rotates, such that clumped litter waste material is directed toward said rake by rotation of said chamber to thereby separate clumped litter waste material from litter material in said chamber, collect the separated clumped litter material and extract the separated collected clumped litter waste material from said chamber.

2. The self-cleaning litter apparatus of claim 1 wherein said rake rotates in a direction about the rake vertical axis and the chamber rotates in a direction about the chamber vertical axis, such that both said rake and said chamber rotate in the same direction.

3. The self-cleaning litter apparatus of claim 1 wherein said chamber rotates at a speed and said rake rotates at a speed, wherein said speed of said chamber is greater than said speed of said rake.

* * * * *